United States Patent
Ly et al.

(10) Patent No.: US 10,979,879 B2
(45) Date of Patent: Apr. 13, 2021

(54) MECHANISMS FOR RESOURCE-DIRECTORY TO RESOURCE-DIRECTORY COMMUNICATIONS

(71) Applicant: CONVIDA WIRELESS, LLC, Wilmington, DE (US)

(72) Inventors: Quang Ly, North Wales, PA (US); Chonggang Wang, Princeton, NJ (US); Xu Li, Plainsboro, NJ (US); Shamim Akbar Rahman, Cote St. Luc (CA); Xiang Sun, Albuquerque, NM (US); Mingming Guo, Maryland Heights, MO (US)

(73) Assignee: Convida Wireless, LLC, Wilmington, DE (US)

( * ) Notice: Subject to any disclaimer, the term of this patent is extended or adjusted under 35 U.S.C. 154(b) by 14 days.

(21) Appl. No.: 16/467,219

(22) PCT Filed: Dec. 8, 2017

(86) PCT No.: PCT/US2017/065238
§ 371 (c)(1),
(2) Date: Jun. 6, 2019

(87) PCT Pub. No.: WO2018/106985
PCT Pub. Date: Jun. 14, 2018

(65) Prior Publication Data
US 2020/0092696 A1    Mar. 19, 2020

Related U.S. Application Data

(60) Provisional application No. 62/431,920, filed on Dec. 9, 2016.

(51) Int. Cl.
*H04W 4/70*     (2018.01)
*G06F 16/24*    (2019.01)
*H04L 29/08*    (2006.01)

(52) U.S. Cl.
CPC .............. *H04W 4/70* (2018.02); *G06F 16/24* (2019.01); *H04L 67/12* (2013.01); *H04L 67/16* (2013.01); *H04L 69/329* (2013.01)

(58) Field of Classification Search
CPC .......... H04W 4/70; G06F 16/24; H04L 67/12; H04L 67/16; H04L 69/329
See application file for complete search history.

(56) References Cited

U.S. PATENT DOCUMENTS

2016/0218992 A1*  7/2016  Hong ...................... H04L 67/02
2016/0275190 A1   9/2016  Seed et al.

OTHER PUBLICATIONS

Cheshire, et al., Internet Engineering Task Force (IETF), Request for Comments: 6763, "DNS-Based Service Discovery", Feb. 2013, 49 pages.

(Continued)

*Primary Examiner* — Afshawn M Towfighi
(74) *Attorney, Agent, or Firm* — BakerHostetler

(57) ABSTRACT

An M2M/IoT resource directory entity may discover and register to other resource directory entities by including criteria attributes in discovery broadcasts and then processing link and metadata that may be included in responses. The resource directory with registrations to other resource directories may service a client request by selecting other resources directories to query based on the request or a query criteria contained therein, and then process link and metadata in responses from the other resource directory entities to aggregate a response to the client. Directory-to-directory registrations may be facilitated via using hierarchical parent-child resource directory identifiers, a peer-to-peer identifier (Continued)

regime, or a combination of the two. Observe notifications may include indicia registrations states, e.g., via change and delete response codes.

12 Claims, 35 Drawing Sheets

(56) References Cited

OTHER PUBLICATIONS

Fielding, et al., Network Working Group, Request for Comment: 2616, "Hypertext Transfer Protocol—HTTP/1.1", Jun. 1999, 114 pages.
Hartke, Internet Engineering Task Force (IETF) Request for Comments: 7641, Observing Resources in the Constrained Application Protocol (CoAP), Sep. 2015, 30 pages.
Nottingham, Internet Engineering Task Force (IETF) Request for Comments: 5988, "Web Linking", Oct. 2010, 23 pages.
Shelby et al., Internet Engineering Task Force (IETF) Request for Comments: 6690, "Constrained RESTful Environments (CoRE) Link Format", Aug. 2012, 22 pages.
Shelby, et al., CoRE Internet Draft, "CoRE Resource Directory draft-ietf-core-resource-directory-07", Mar. 2016, 55 pages.
Shelby, et al., Internet Engineering Task Force (IETF), Request for Comments: 7252, "The Constrained Application Protocol (CoAP)", Jun. 2014, 112 pages.

\* cited by examiner

| # | # | # | # | # |
|---|---|---|---|---|
| Service Provider ID | Country ID | Site ID | Local ID | |

| Service Provider ID | Company ID | Region ID | Branch ID | Local ID |
|---|---|---|---|---|

| Service Provider ID | Govern-ment ID | Depart-ment ID | Location ID | Network ID | Local ID |
|---|---|---|---|---|---|

Fig. 13

MECHANISMS FOR RESOURCE-DIRECTORY TO RESOURCE-DIRECTORY COMMUNICATIONS

CROSS-REFERENCE TO RELATED APPLICATIONS

This application is the National Stage Application of International Patent Application No. PCT/US2017065238 filed Dec. 8, 2017 which claims the benefit of U.S. Provisional Patent Application Ser. No. 62/431,920 filed Dec. 9, 2016 the disclosure of which is hereby incorporated by reference as if set forth in its entirety herein.

BACKGROUND

Machine-To-Machine (M2M), Web-of-Things (WoT), and Internet-Of-Things (IoT) network deployments may support M2M/IoT service layers such as oneM2M, ETSI M2M, and OMA LWM2M operating across nodes such as M2M/IoT servers, gateways, and devices which host M2M/IoT applications and services. Operations of these kinds may include communications as described in, for example, IETF standards for Resource Directory, CoRE Link Format, CoAP, and CoAP Observe.

SUMMARY

An M2M/IoT resource directory entity may discover and register to other resource directory entities by including criteria attributes in discovery broadcasts and then processing link and metadata that may be included in responses. The resource directory with registrations to other resource directories may service a client request by selecting other resources directories to query based on the request or a query criteria contained therein, and then process link and metadata in responses from the other resource directory entities to aggregate a response to the client. Directory-to-directory registrations may be facilitated via using hierarchical parent-child resource directory identifiers, a peer-to-peer identifier regime, or a combination of the two. Observe notifications may include indicia registrations states, e.g., via change and delete response codes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF FIGURES

A more detailed understanding may be had from the following description, given by way of example in conjunction with accompanying drawings.

FIG. 13 illustrates example RDID data structures.

DETAILED DESCRIPTION

Figure 1:
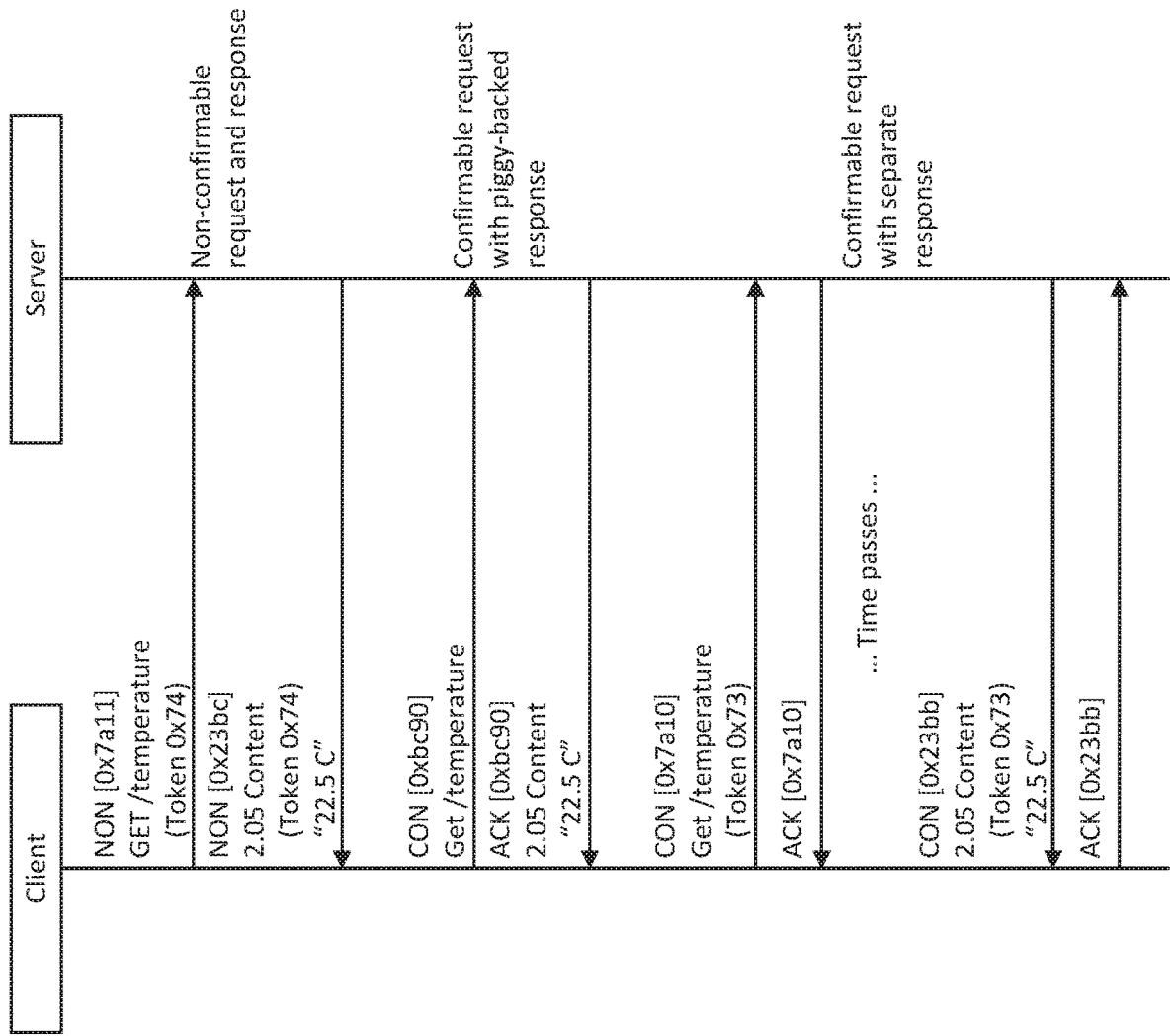
FIG. 1 shows an example call with message exchanges between a CoAP client and a CoAP server.

An M2M/IoT resource directory entity may discover and register to other resource directory entities by including criteria attributes in discovery broadcasts and then processing link and metadata that may be included in responses. The resource directory with registrations to other resource directories may service a client request by selecting other resources directories to query based on the request or a query criteria contained therein, and then process link and metadata in responses from the other resource directory entities to aggregate a response to the client. Directory-to-directory registrations may be facilitated via using hierarchical parent-child resource directory identifiers, a peer-to-peer identifier regime, or a combination of the two. Observe notifications may include indicia registrations states, e.g., via change and delete response codes.

The goal of a Resource Directory (RD) is to host CoRE Link Formats representing resources of Internet of Things (IoT) devices and to make them available to RD clients that may be interested in the resources. These IoT devices may have limited capabilities and have sleeping states as well. The devices, referred to as "endpoints" in the IETF CoRE Resource Directory (RD) Internet Draft (draft-ietf-core-resource-directory-07), register their resources as CoRE Link Formats to a registrar RD and a client queries the RD to find these links.

RD to RD communication may be enabled by defining architectural structures wherein RDs are able to communicate with each other either as peers or in a hierarchy, allowing various approaches to forming flexible registrations.

Existing RD Discovery methods may be enhanced to foster RD-to-RD communications, e.g., via an RD Identifier (RDID) provisioned to each RD. The RDID may be included as part of the RD Discovery response. A querying RD or an endpoint may select which RD to register to, based on its architectural deployment and RDID.

A new RD Registration may be used to allow RDs to register with each other. For example, after the completion of RD Discovery, registration may proceed in accordance with a peer-to-peer or hierarchical approach to communications.

RD operations may be enhanced via RD-to-RD communications. For example, a querying RD may provide enhanced lookup capabilities to querying clients by using new RD Query attributes to target and/or limit Extended Searches sent to other RDs. Answering RDs may return RD Meta-data in the Extended Search responses to provide additional information about the CoRE Links. In addition, a new enhanced mechanism based on CoAP Observe functionality may be used to allow endpoints' CoRE Link Formats to be cached in RDs other than the registrar RD, without requiring the endpoints to register their resources to multiple RDs to get maximum exposure.

New CoRE Link attributes may be added to support RD-to-RD communications. New RD Query attributes and RD Meta-data may be added to enable enhanced RD lookups. For example, a resource directory query or a resource directory discovery request may be qualified by the use of attributes such as a resource directory identifier (e.g., for a specific resource directory), a qualifier of resource directory identifiers (e.g., to identify class, hierarchical level, or parental or peer relationship), a limit on the number of resource directories queried, a response time requirement, a geo-fence area, a set of GPS coordinates, a registration lifetime cutoff, an endpoint awake requirement, a loading capacity, a cache availability requirement, and a remaining lifetime requirement.

The current IETF RD draft lacks a mechanism for RDs to communicate with each other. As a result, client queries to an RD will only generate results limited to the CoRE Links that are hosted on that particular RD. In an IoT world, which is forecasted to include billions of devices, this limitation constrains an RD's ability to locate IoT resource links residing on other RDs. End devices also suffer from a lack of exposure to their resource links due to the limited reach of the RD.

An RD's inability to communicate with other RDs thus places an unnecessary burden on RD clients and endpoints. A client may need to perform multiple discoveries and queries to find all the resource links it is looking for. Endpoints currently need to register to multiple RDs to achieve maximum exposure of its resource links. These limitations may be addressed using the RD-to-RD communications methods described herein.

TABLE 1

Acronyms

| | |
|---|---|
| ACK | Acknowledgement (CoAP message) |
| CoAP | Constrained Application Protocol |
| CON | Confirmable (CoAP message) |
| CoRE | Constrained RESTful Environments |
| ct | Content Type (CoRE Link Format attribute) |
| DNS | Domain Name System |
| DNS-SD | Domain Name System-Service Discovery |
| EP | Endpoint |
| et | Endpoint Type (CoRE Link Format attribute) |
| FQDN | Fully Qualified Domain Name |
| GPS | Global Positioning System |
| HTTP | Hypertext Transport Protocol |
| ID | Identification |
| IP | Internet Protocol |
| IoT | Internet of Things |
| lt | Lifetime (CoRE Link Format attribute) |
| M2M | Machine-to-Machine |
| NON | Non-confirmable (CoAP message) |
| RD | Resource Directory |
| RDID | RD Identifier |
| RFID | Radio Frequency Identification |
| rt | Resource Type (CoRE Link Format attribute) |
| SP | Service Provider |
| URI | Uniform Resource Indicator |

TABLE 2

Terminology

| | |
|---|---|
| Client | An entity that uses the Lookup Interface of an RD to search for CoRE Links that represent resources hosted by endpoints. |
| Context | The term refers to contact information an RD has for an endpoint or another RD. Typically, this comes in the form of an IP address and port number or an FQDN of the endpoint or RD during registration or update to a registration. |
| CoRE Link Format | According to IETF RFC 6690 Constrained RESTful Environments (CoRE) Link Format, a CoRE Link Format is a particular serialization of typed links based on the HTTP Link Header field serialization defined in Section 5 of IETF RFC 5988 Web Linking, but carried as a resource representation with a media type. In the context of RD, endpoints register the resources they host as CoRE Link Formats to an RD. Then clients search for these resources and are provided the CoRE Links by the RD. |

TABLE 2-continued

Terminology

| | |
|---|---|
| Endpoint | An IoT device that registers its resource URI(s) to a RD. It is defined by the IETF RD draft as, "an endpoint is used to describe a web server that registers resources to the Resource Directory. An endpoint is identified by its endpoint name, which is included during registration, and is unique within the associated domain of the registration." |
| Domain | "In the context of a Resource Directory, a domain is a logical grouping of endpoints. This specification assumes that the list of Domains supported by an RD is pre-configured by that RD. When a domain is exported to DNS, the domain value equates to the DNS domain name." See the IETF RD draft. |
| Geo-fence | A virtual perimeter for a geographic area in the real-world. It may be specified as a geometric shape such as a circle or a rectangle or some pre-set boundaries such as a neighborhood. Typically, GPS coordinates or RFID are used to define the boundaries. |
| Extended Searches | The process an RD undertakes to query other RDs for CoRE Links that match the search criteria of a client. These searches are enabled by RD-to-RD communications. The querying RD of the extended search then aggregates all responses together and returns the list of CoRE Links to the client. |
| RD-to-RD Registration | The process of an RD registering to another RD. |
| Registering RD | An RD that is registering to another RD and provides various metadata to enable RD-to-RD communications. |
| Registrar RD | An RD that accepts registrations from other RDs and endpoints. |
| Resource Directory | "A web entity that stores information about web resources and implements the REST interfaces defined in this specification for registration and lookup of those resources." See the IETF RD draft. Typically, an RD is an "always on" node that is implemented as a database to contain registration details of endpoints and the resources they host as CoRE Link Formats. RD may also contain information about other RDs. |
| Web Linking | According to RFC 6690, Web Linking is a "framework for indicating the relationships between web resources." |

IETF RFC 7252 Constrained Application Protocol (CoAP) was designed for use in IoT systems where devices have limited capabilities in terms of CPU, RAM, ROM, etc. It offers functionality similar to the IETF RFC 2616 Hypertext Transfer Protocol (HTTP) that is widely used in the Internet but operates in a lightweight manner. These protocols provide for request-response mechanisms for two entities to communicate with each other. Throughout the IETF RD draft, the messages transmitted between an endpoint or client to an RD are either formatted in CoAP or HTTP protocol. The call flows in the figures include CoAP messages.

FIG. 1 provides some examples of message exchanges between a CoAP client and a CoAP server. The first set of exchange shows a CoAP client sending a non-confirmable (NON) request to the CoAP server targeting the/temperature resource. A token is provided for matching responses to requests and a message ID ([0x7a11]) is used for detecting duplicate messages. The CoAP server returns a NON response with the content of the resource, an appropriate response code (e.g. 2.05 Content), the token from the request, and a different message ID as it is a separate message. This set of message exchange is used when reliable transmission is not required between the CoAP client and the CoAP server.

In the second set of message exchange, the CoAP client sends a confirmable (CON) request and once again targets the/temperature resource but using a different message ID. The CoAP server returns a piggy-backed response in which the content of the resource is combined with the acknowledgement to the confirmable request and an appropriate response code. This set of message exchange is used when reliable transmission is required between the CoAP client and the CoAP server.

A third set of message exchange is shown in which the CoAP server is not able to immediately return a response to the CoAP client. In this case, the CoAP server returns an acknowledgement (ACK) response to the CoAP client with the same message ID as the one provided in the request. Then when the content of the resource is available, the CoAP server returns a CON response with the content of the resource, an appropriate response code, a different message ID, and the token provided in the request.

RFC 6690 CoRE Link Format was developed to describe the resources of constrained devices similar to how RFC 5988 Web Linking describes web resources. The purpose of these links is to provide for discovery of and access to those resources. As such, each link consists of a Universal Resource Identifier (URI) that locates the resource and some attributes that further describe the resource. The Web Links are carried in the HTTP Link Header format of the associated resource while CoRE Links are carried in the payload as resource representation. The links are discovered through "Web Discovery" and CoRE Resource Discovery, respectively.

Figure 2:
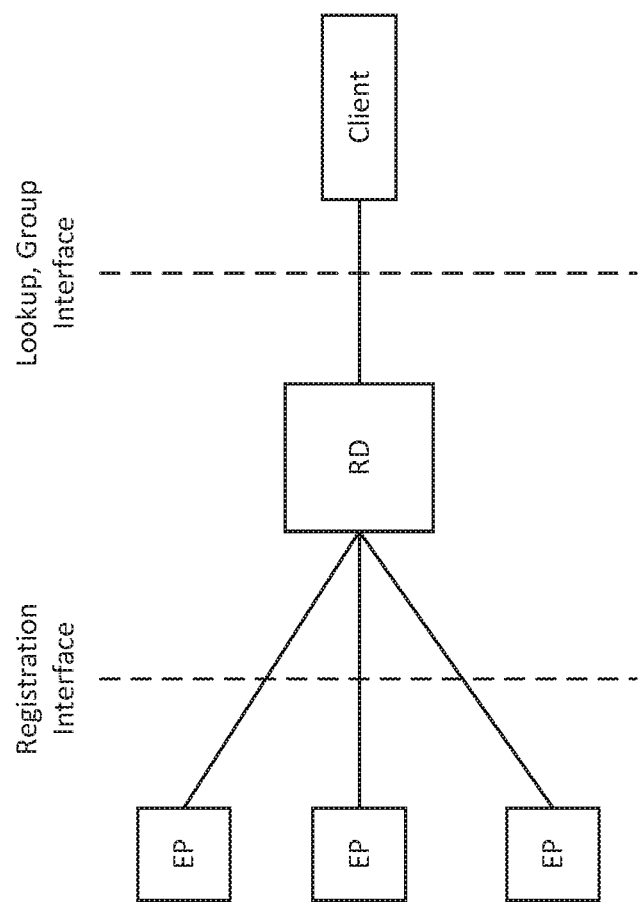
FIG. 2 illustrates the architecture of the CoRE RD.

The IETF RD draft provides a centralized server where IoT endpoints may register their resources for discovery over a web interface. The salient features of IoT endpoints (i.e. sleep-enabled devices and/or devices located in disperse networks) make the discovery of their resources difficult. Being a centralized server, the RD hosts the descriptions of resources residing on various IoT endpoints and allows for clients to search the RD for those resources. As such, both registration and lookup interfaces are defined to enable these functionalities. In addition, a third interface—group—provides the ability to combine endpoints into groups. FIG. 2 shows the architecture of the CoRE RD.

Figure 3:
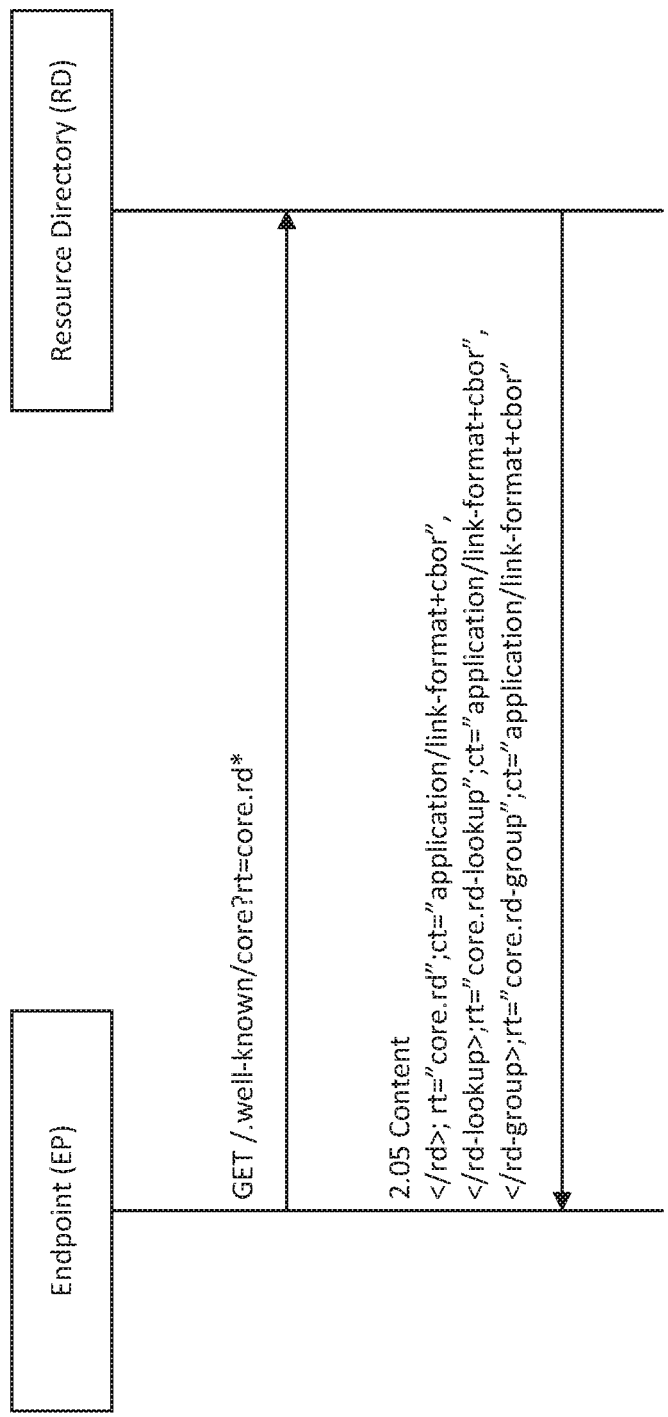
FIG. 3 shows an example call flow for RD Discovery.

If an endpoint is not provisioned with sufficient information to communicate to an RD, it may perform an RD Discovery method as shown in FIG. 3. The endpoint may multicast a GET message targeting the "/.well-known/core" URI. In the URI, the endpoint may include an optional CoRE Link Format rt attribute, which indicates the type of discovery it would like to perform. In this case, rt stands for Resource Type and may consist of one of the following values: "core.rd*", "core.rd-lookup", and "core.rd-group". These values correspond to the interfaces the RD supports. The "*" is a wildcard used to get the RD to return information for all its interfaces that match the preceding text. An RD will then respond with the contents of its interfaces and may also include hints on the content type it supports. These hints are included as values of the ct CoRE Link Format attribute.

Figure 4:
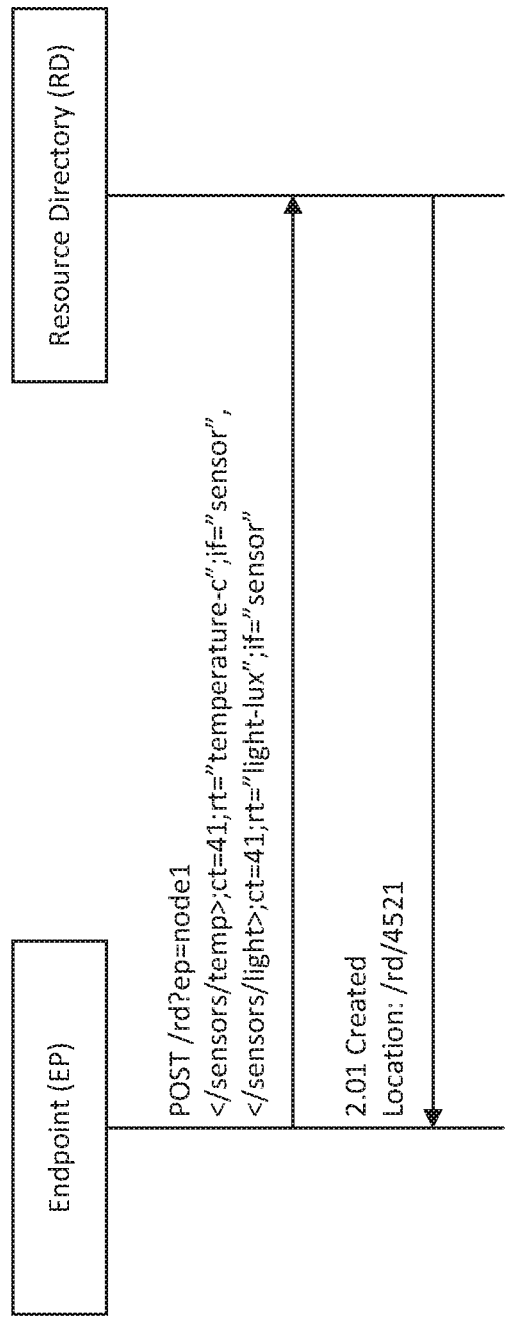
FIG. 4 shows an example call flow for an endpoint registering to an RD.

Once an endpoint discovers the RD, it may then proceed to register its resources on the RD through the Registration Interface. FIG. 4 shows an endpoint registering to the RD. The endpoint sends a POST request targeting "/rd" and provides an endpoint name "node1". In the payload, the endpoint includes a list of CoRE Link Formats corresponding to all the resources the endpoint wants to register to the RD. The RD returns an appropriate response to the request and if successful, the RD also includes a location for the endpoint registration. This location is used by the endpoint to update/delete its registration on/from the RD.

Figure 5:
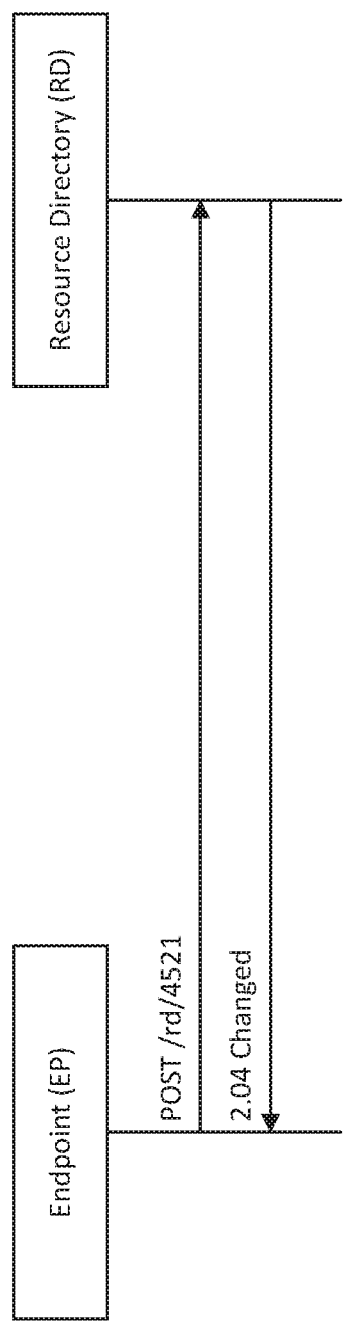
FIG. 5 shows an example call flow for an endpoint refreshing its registration.

When an endpoint successfully registers to an RD, the RD keeps the registration active for a certain period of time as defined by the lifetime attribute (lt). The lt attribute may be provided by the endpoint or it could be determined by the RD based on some default value. An endpoint must maintain its registration status by periodically refreshing its registration information with the RD. Endpoints perform this as shown in FIG. 5. The endpoint performs a POST request towards the URI returned in the Location header of a successful registration. The RD returns a 2.04 Changed response to indicate a successful update. Besides updating its registration lifetime, an EP may also update its context information if its IP address or port number changes.

Figure 6:
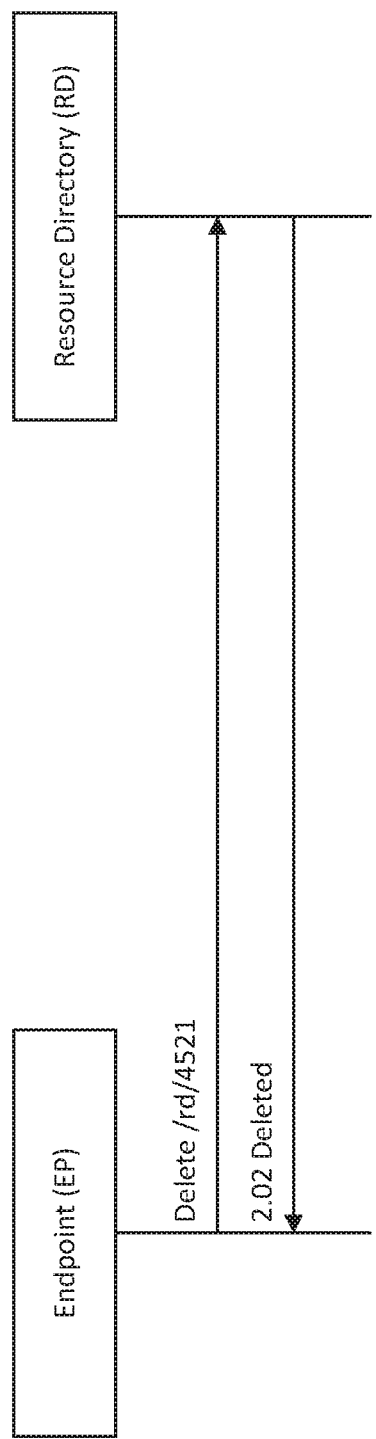
FIG. 6 shows an example call flow for registration removal.

Similarly, EP registration removal is an explicit method in which an endpoint removes its registration information from the RD. FIG. 6 shows this registration removal method and the RD response of 2.02 Deleted.

Figure 7:
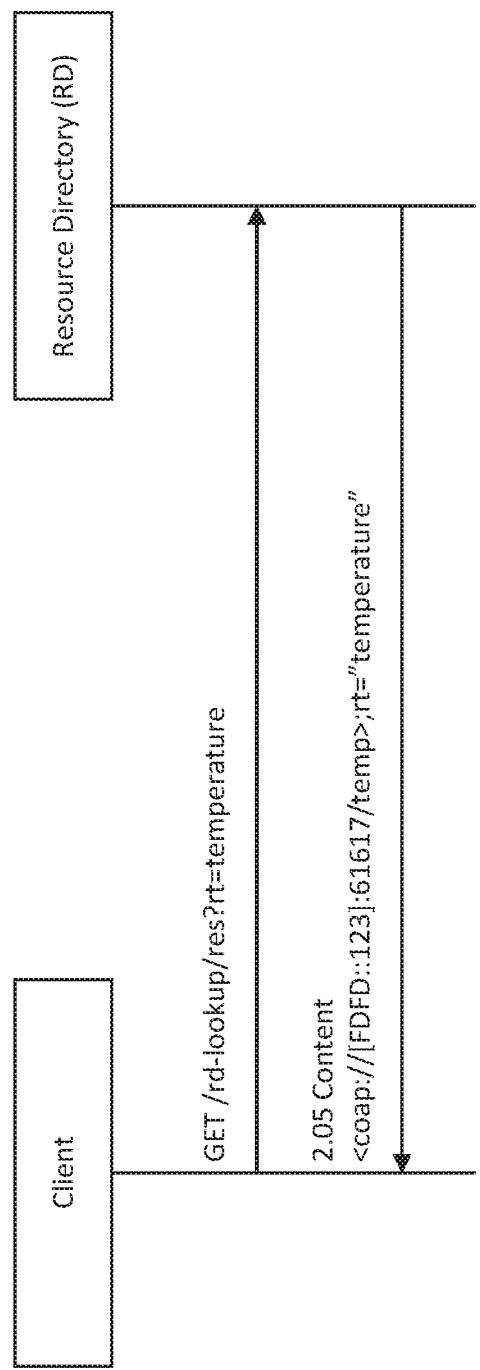
FIG. 7 shows an example call flow for a client querying a resource.

The RD also has an interface for performing lookup of the CoRE Links it hosts. A client may use the RD's Lookup Interface to query for the CoRE Links in which the client is interested. FIG. 7 shows an example of a client querying for a CoRE Link with a resource type of temperature. If there is a matching resource type, the RD returns the CoRE Link(s) corresponding to the resource(s). The client may then contact the endpoint to get the desired resource using information provided by the CoRE Link.

IETF RFC 6763 DNS-based Service Discovery specifies a mechanism for clients to discover resources using standard DNS queries. Typically, DNS-SD provides for coarse-grained discovery of an endpoint's IP address, port number, and protocol while RD provides for more fine-grained discovery of resources and their attributes. As such, DNS-SD and RD are complementary to each other and the RD resource records are named and structured in such a way to facilitate service discovery. IETF RD draft defines a mapping between CoRE Link Format attributes to DNS resource records so resources within the RD may be discovered by using DNS-SD.

CoAP Observe, as described in IETF RFC 7641 Observing Resources in the Constrained Application Protocol (CoAP), is an extension of the CoAP protocol to allow CoAP clients to get notifications for changes to a resource residing on a CoAP server. The CoAP client "observes" the resource by registering to the CoAP server using the GET method targeting the URI of the resource and setting the observe option equal to 0. Upon receiving the request, the CoAP server returns the content of the resource to the CoAP client. If the CoAP server accepts the observe registration, it will include an Observe option in the form of a sequence number in the initial GET response. This indicates to the CoAP client the observe request was granted. Then, whenever a change of state occurs to the observed resource, the CoAP server will send a notification message to the CoAP client.

Figure 8:
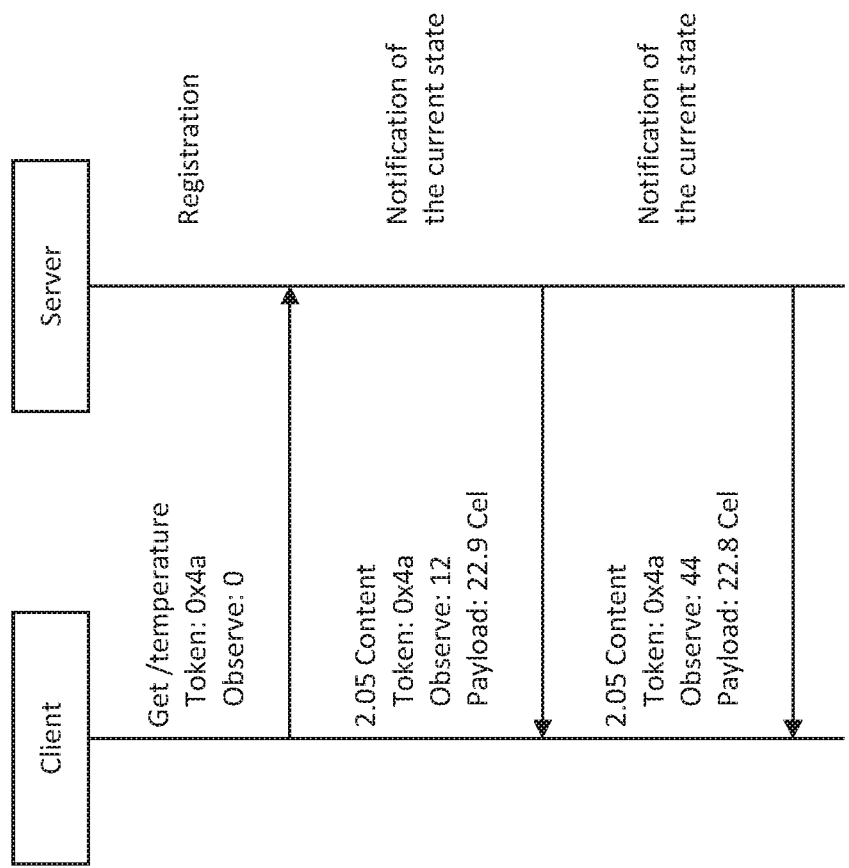
FIG. 8 shows an example call flow to observe messages between a CoAP client and a CoAP server.

FIG. 8 shows a sequence of observe messages between a CoAP client and a CoAP server. Initially, the CoAP client sends a GET request targeting the /temperature URI, a token 4a, and the observe option value set to 0. In response, the CoAP server returns a 2.05 Content response code, the same token 4a, an observe sequence number 12, and the payload content 22.9 Cel. The inclusion of the observe sequence number in the response indicates that the CoAP server has granted the CoAP client an observation to the resource /temperature. Then a second notification is sent by the CoAP server in response to a change in state of the temperature resource. The response includes a new incremented observe sequence number, the new content of the resource, and the token provided by the original observe registration request. The CoAP server continues providing notifications to the CoAP client whenever a change in state occurs to the resource until the observe request is cancelled using one of the mechanisms defined in RFC 7641. Notice that the response code of all the notify messages are 2.05 Content to indicate the content of the resource is provided in the payload.

Figure 9:
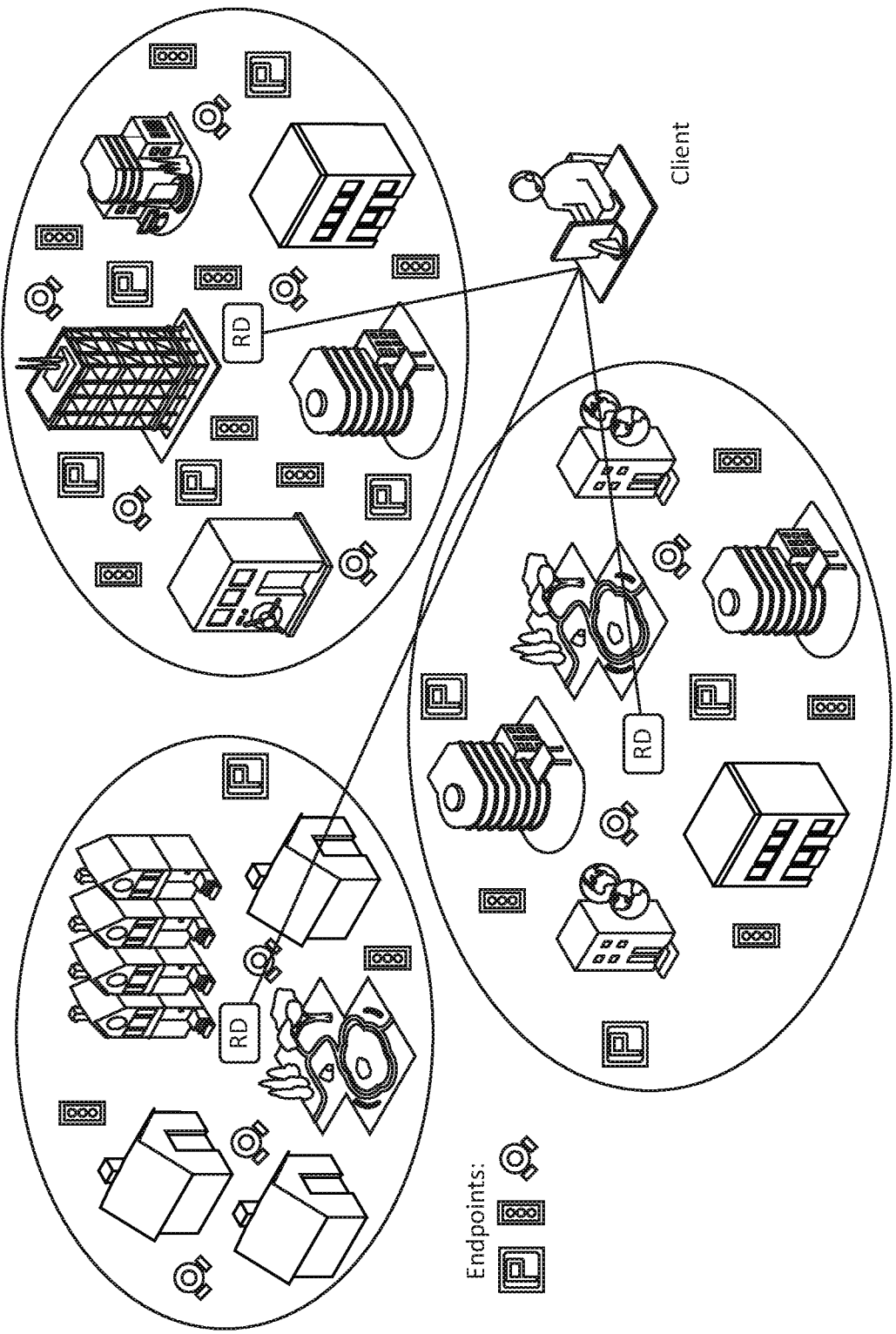
FIG. 9 illustrates an example smart city with RDs is deployed in various geographic areas.

FIG. 9 shows a smart city use case in which an RD is deployed in different areas of a city. The RDs host CoRE Link Formats of resources associated with traffic and street lights, fire hydrants, and parking meters and garages. Within a city's limits, there may be tens to hundreds of RDs deployed depending on the size of the city. Each device registers all its resources as CoRE Link Formats to a nearby RD and manages the registrations using the RD's Registration Interface.

An RD client may then query other RDs using each RD's Lookup Interface to find the resources the client is looking for. The RD client currently needs to query each RD separately if it wants to find a particular type of resource in the whole city. For example, if a user (RD client) wants to find all the parking garages in a certain part of the city, it first needs to locate all the RDs that serve that portion of the city and then perform individual queries against those RDs. Furthermore, if a fire marshal wants to find all the fire hydrants throughout the city, the fire marshal would first need to discover all the RDs that service the city and then perform individual queries. As stated before, there could be tens to hundreds of RDs deployed throughout the city limits.

The requirement of having the RD client discover and query each RD is a result of a limitation in the IETF RD draft. This limitation exists since the RD specification lacks a mechanism for RDs to communicate with each other. As a result, queries to an RD will only generate results limited to the CoRE Links that are hosted on that particular RD. In an IoT world where it is forecasted to include billions of devices, this limitation cripples an RD's ability to locate remote IoT resources for the clients it serves. End devices also suffer from a lack of exposure due to the limited reach of the RDs.

Figure 10:
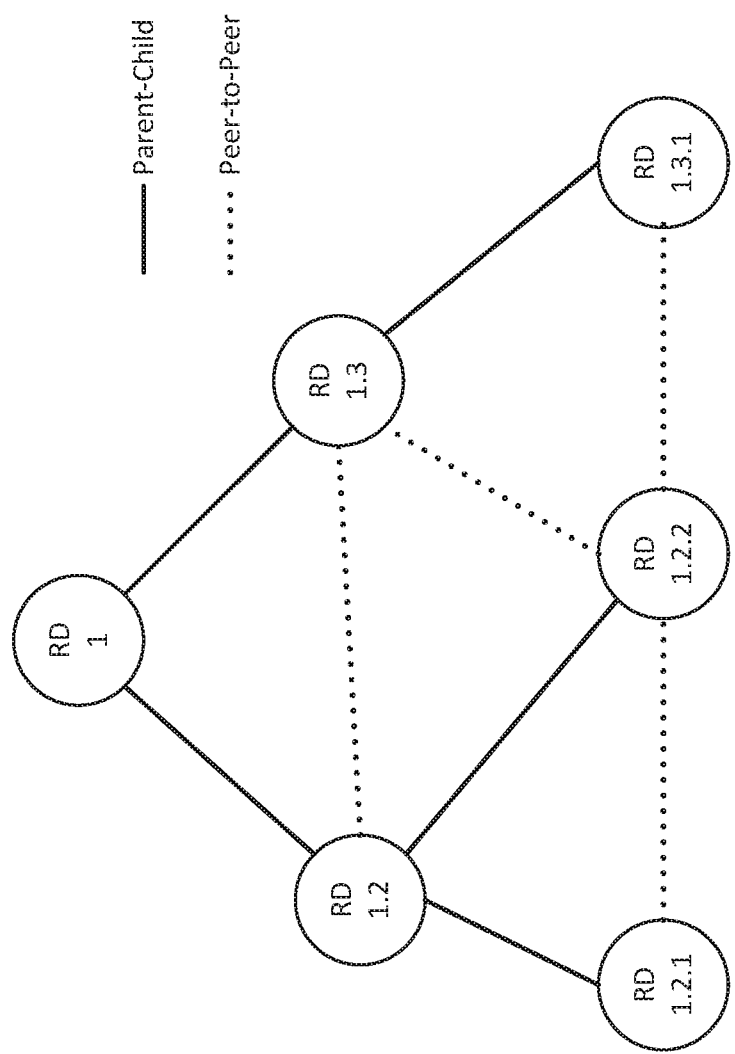
FIG. 10 illustrates and example of parent-child and peer relationships among various RDs.

When RDs are able to communicate with each other, they may communicate as peers or in a parent-child relationship as shown in FIG. 10. This classification of parent-child or peer-to-peer is important during RD-to-RD Registration when RD Identifiers (RDID) are exchanged. An RD classified as a parent provides RDID management whereas peer RDs do not have this functionality. In addition, a child or peer RD may provide more comprehensive results to client queries by utilizing parent RDs during Extended Searches. The architecture offers flexibility in structured deployment scenarios whether in a top down or bottom up approach that allows for easier management of the RDIDs. However, the architecture does not prevent ad-hoc deployments. In such instances, some features of RDID management may not be available, for example, but Extended Searches and other features may still apply.

Figure 11:
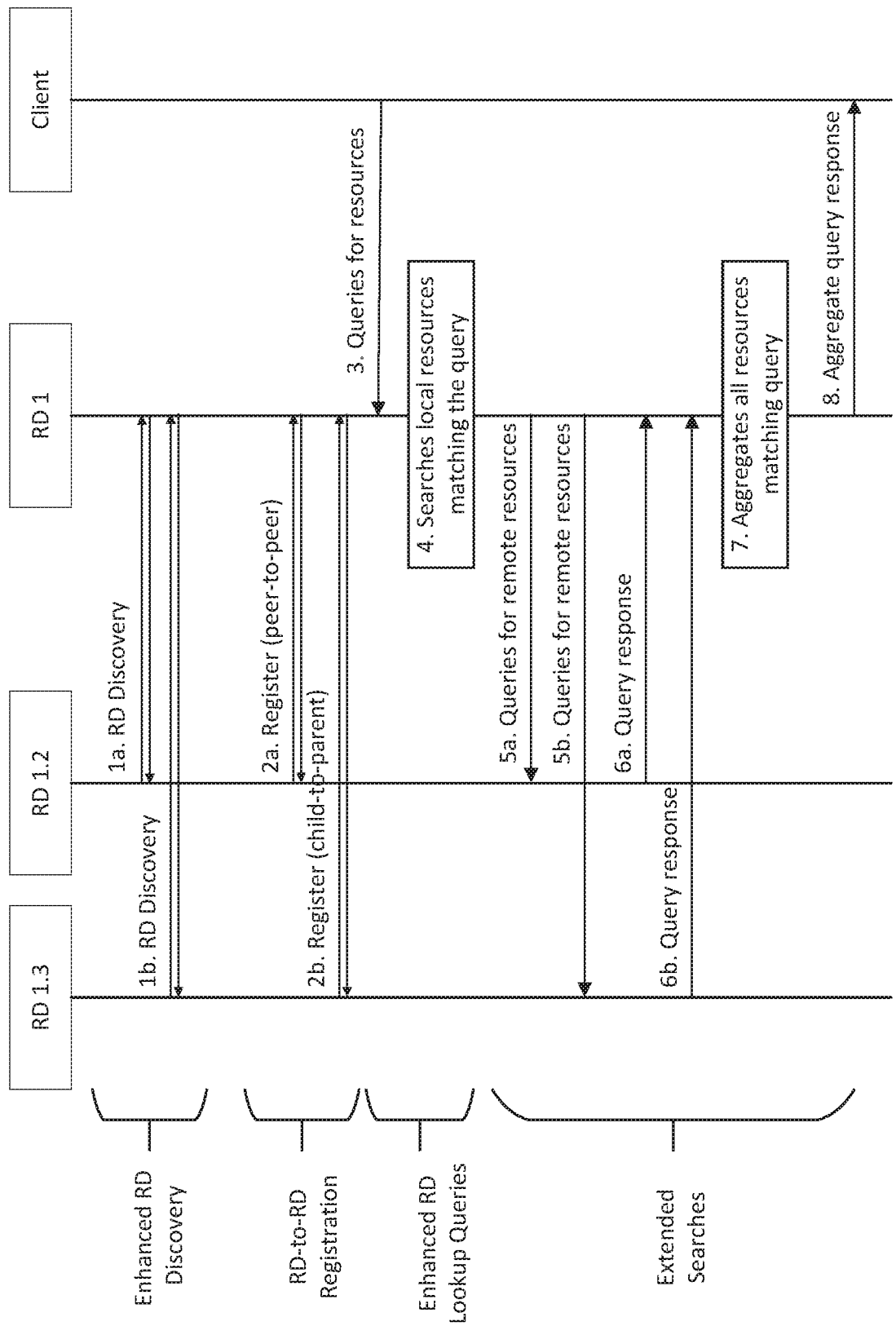
FIG. 11 shows an example call flow featuring new and enhanced RD-to-RD communications.

To enable RD-to-RD communications, FIG. 11 shows the four main features that are introduced or enhanced. First, the RD Discovery method is enhanced to provide a new RDID in the response to the discovery request. This enhancement indicates RD-to-RD communication is available and may help a recipient RD decide which RD to register to. After discovery, the RDs may register to each other using the new RD-to-RD Registration method, which varies depending on the RD classification (e.g. parent, child, or peer). Once RDs are registered to each other, they may provide enhancements to client lookup queries by expanding the scope of CoRE Links that could be returned to a client due to the added capability of searching additional RDs. The lookup query is enhanced through the use of new RD Query attributes to enable the new Extended Search capability. Finally, the results of the Extended Search may include RD Meta-data that provide added context to the original lookup query.

Before RDs are able to communicate with each other, they must first discover neighbor or remote RDs. To that end, an RD may perform an RD Discovery method using the "./well-known/core" target URI as specified in FIG. 3. RD Discovery may be performed when an RD is first deployed, and the method may be performed periodically in order to discover newly deployed RDs. In practice, other equivalent mechanisms may be invoked when an RD performs discovery. In order to enable RD-to-RD communication, RD Discovery methods may be enhanced by allowing requesting RDs to provide RD Query attributes described in, e.g., in reference to FIG. 12, and receiving RDs are required to provide an RDID in addition to other information required in an RD Discovery response. The inclusion of RD Query attributes allows a requesting RD to narrow the search to a specific RD meeting its requirements. In addition, the receiving RD may provide the requestor with meta-data such as geo-fence area, load capacity, resource and endpoint types, and other information that may help the requestor (either RD or endpoint) decide which RD to register to. The RDID is an identification mechanism that is required in RD-to-RD communication and will be described, e.g., in reference to FIG. 13.

Figure 12:
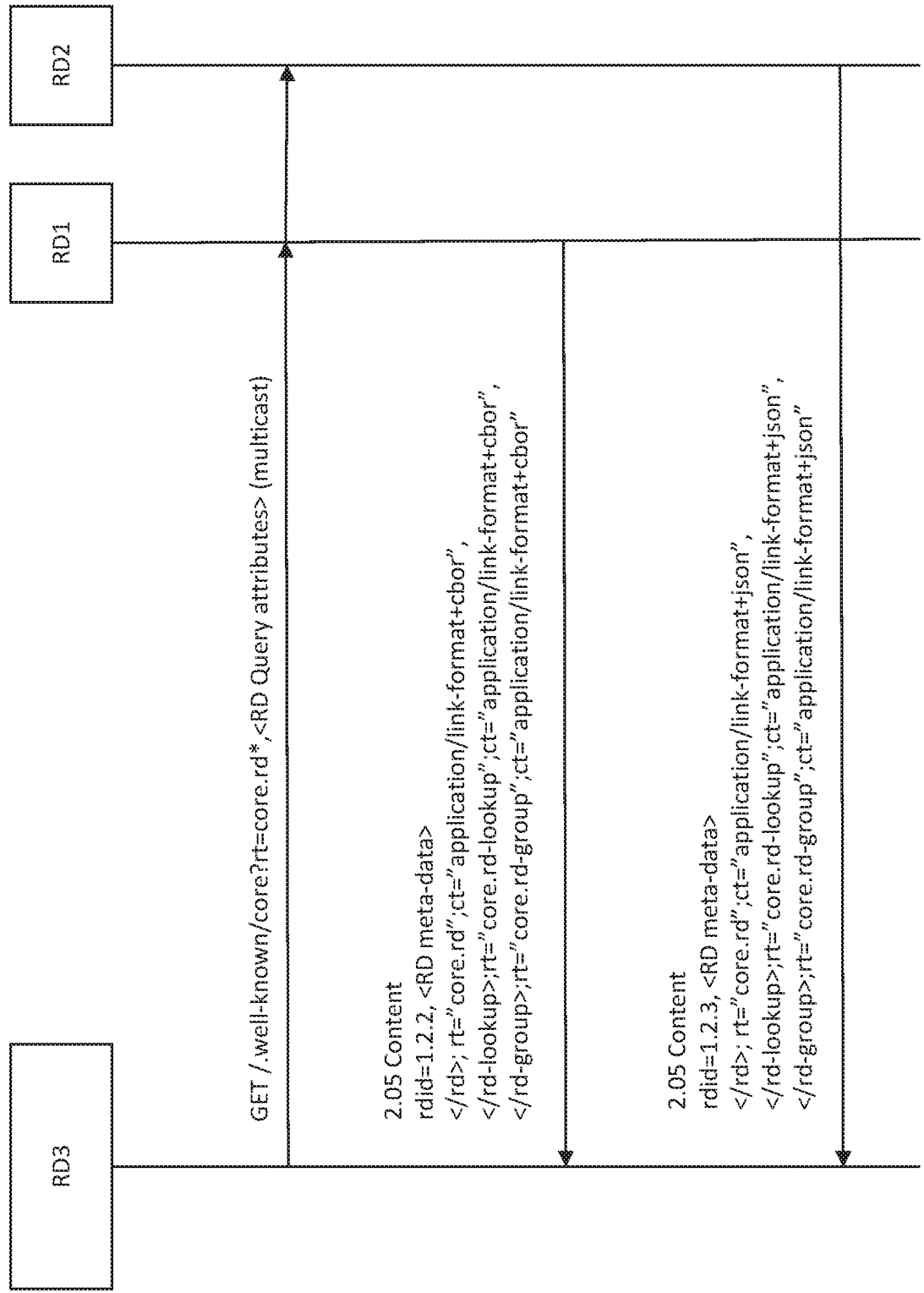
FIG. 12 shows an example call flow for an RD Discovery method.

FIG. 12 shows the RD Discovery method with the new enhancements of the RD Query attributes in the discovery request and the inclusion of RDID and RD Meta-data in the discovery response. When the RD Discovery request is multicasted, the RDID may offer added information to help the querying RD decide on which RD to register to. For example, FIG. 12 shows RD3 multicasting the Discovery request and receiving two responses from receiving RDs. The RDID of the receiving RDs indicate they share the same parent RD in a structured deployment. Further information may be gleaned if a partial RDID was pre-provisioned to RD3, as described, e.g., in reference to FIG. 20. The RDID may indicate a parent, peer, or child RD of the requesting RD depending on the architectural deployment scenario. Using this information and the intended operation of the requesting RD, a decision may be made to decide which RD to register to.

The RD Discovery response may also apply to other discovery mechanisms such as DNS-SD. In this case, a querying RD finds a registrar RD using DNS-SD. The RDID and other RD Meta-data may be included as part of the DNS-SD TXT resource record, which offers additional information about the RD. As a result, the information provided in an RD Discovery response as shown in FIG. 12 is also provided by DNS-SD. Using DNS-SD, a querying RD may locate RDs beyond its local service area that will further enhance the Extended Search capability, as described, e.g., in reference to FIG. 25.

A new attribute called the RDID may be used by RDs during RD Discovery and RD-to-RD Registration, as described, e.g., in reference to FIGS. 18-23. The RDID serves as an identifier that offers flexibility to the registration methods. As a result, the use of the RDID allows for easier identification provisioning and management in large deployment scenarios. This RDID consists of a sequence of numbers delimited by the character ".", such as "1.2.3". Alternatively for more complex deployments, the elements of the RDID may include alphanumeric characters. For example, a simple, structured deployment may be achieved in which only numbers are used. The RDID may be structured such that the first number is for service provider identification and subsequent numbers represent the hierarchical deployment scenarios of the service provider. FIG. 13 shows some examples of how RDIDs may be constructed. Using such a scheme will enable fewer conflicts with duplicate RDIDs. The RDID may be pre-provisioned during deployment by the RD owner or service provider. It could also be partially provisioned with a prefix RDID or not provisioned at all—in both cases, the registrar RD will provide the RDID suffix or the entire RDID respectively for a successful RD registration.

The specific use of RDID may vary from one deployment scenario to another. For example, the RDID may be explicitly defined by the RD's owner or service provider. There is no restriction on whether an RD may have only one RDID. For example, an RD may have multiple RDIDs in ad-hoc deployments and the Registration Table described herein supports such cases. In addition, the inclusion of the RDID in all RD-to-RD communications is meant to indicate this is a communication from an RD and enables all the features within the communications (e.g. RD Query attributes, RD Meta-data, Extended Search, etc.), rather than from a client or an endpoint. Structured deployments simplify RDID provisioning and management. When RDID is used in an ad-hoc manner, RDID provisioning and management increase in complexity and there may be more conflicts with duplicate RDID.

A new RD-to-RD Registration method allows RDs to register to each other. An RD will typically register to one or more RDs so Extended Search is enabled; however, it is not necessary or required for an RD to register to all RDs that are discovered. The registration requires an RDID that is provided by the registering RD to the registrar RD—an empty or incomplete RDID fulfills this requirement if the registering RD is a child RD. Additional information about the CoRE Links the registering RD hosts as well as its location information may also be provided for use in enhancing client queries, as described, e.g., in reference to FIGS. 14-15. The RDID may be pre-provisioned during deployment or be obtained from the registrar RD if the registering RD is going to be a child RD of the registrar RD.

Figure 14:
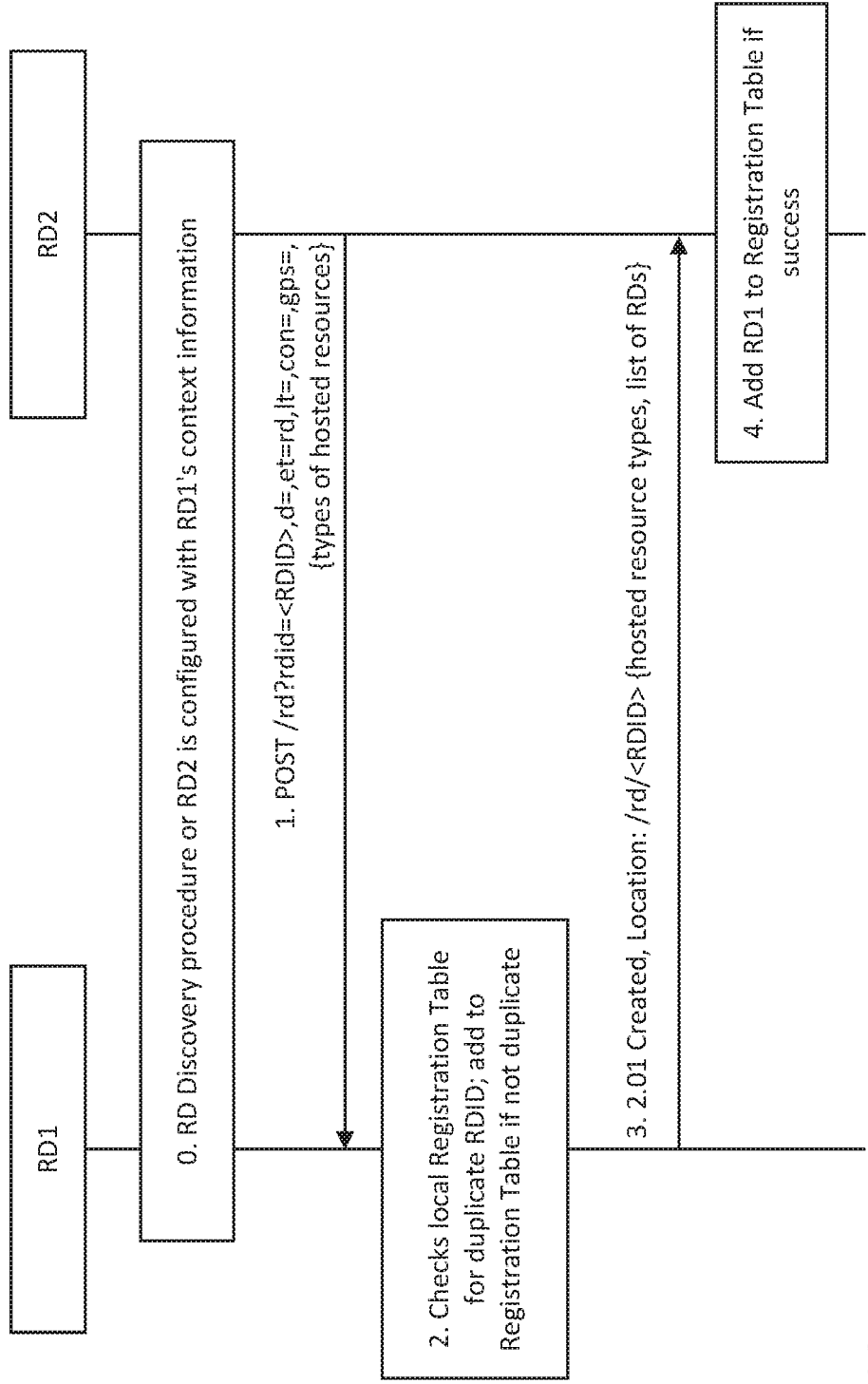
FIG. 14 shows an example call flow for an RD-to-RD Registration method.

FIG. 14 shows a generic RD-to-RD Registration method in which RD1 is the registrar RD and RD2 is the registering RD. Values for some CoRE Link attributes were omitted to reduce clutter in the diagram. In step 0, RD2 either performs RD Discovery or is provided with RD1's context information either through pre-provisioning or as a result of Service Discovery via DNS-SD.

In step 1, RD2 performs a POST request using the target URI "/rd" or an appropriate URI returned by the targeted RD during RD Discovery. Alternatively, a PUT request could be used as well. Part of the request contains a mandatory "RDID" attribute with an RDID. Optionally, the endpoint type (et) may be set to "rd" to indicate this is an RD-to-RD communication. Additional information about the registration could also be provided such as the GPS coordinates of the registering RD, its geo-fenced coverage area, and the endpoint and/or resource types the registering RD hosts. The attributes d, lt, and con are existing CoRE Link attributes defined by IETF RD draft. Their values are not pertinent to the generic method and are included for completeness. Other CoRE Link attributes may also be included to provide the registrar RD with as much information about the registering RD as possible. This will enhance the registrar RD's ability to better perform Extended Searches, as described, e.g., in reference to FIG. 25.

In step 2, RD1 checks its local Registration Table for duplicate RDID and makes a determination on the registration request. If there are no duplicates, RD1 adds the RDID provided in step 1 to its Registration Table.

In step 3, RD1 returns an appropriate response code based on results of the check performed in step 2. In addition, it may include extra meta-data like the ones provided by the registering RD in step 1. This exchange of meta-data about each RD may be used later to improve client searches and help decide which RD's to target for RD Extended Searches as, as described, e.g., in reference to FIG. 25.

In step 4, RD2 adds an entry to its own Registration Table for RD1, indicating it is a parent RD if that is the case.

Within the registrar RD, a Registration Table is maintained that lists information of all registering RDs. The table contains information provided by the registering RDs such as rt, et, and ct CoRE Link attributes and an example of what information is kept in this table is provided in Table 3. Some fields in Table 3 are denoted by " . . . " for brevity so the entire table may fit within the margins of the page. In addition, the table provides the parent RD the current RD is registered to, as shown by entry #1. Entries 2 to 4 are child RDs of the current RD while entry 5 is a peer RD. The rest of the table provides CoRE Link Format attributes lt, rt, et, and ct along with a geo-fence coverage area that the registering RD serves. This additional information will be used to enhance client searches to provide more comprehensive results that existing RD does not provide.

indicating the reason of failure. Some example reasons include "Bad Request", "Duplicate RDID", and "Service Unavailable".

Second, the registrar RD may provide a registration failed response with an error code and with a list of neighbor RDs, which may include peer and/or child RDs. The list of neighbor RDs may be used by the registering RD to register to another RD.

Third, the registrar RD may provide a registration failed response with error code and with a suggestion of a new RDID that is valid for a new registration. The registrar RD is providing an RDID to the registering RD for use in a new registration request that will be accepted. The registering RD may then use the suggested RDID in a new registration message.

Figure 15:
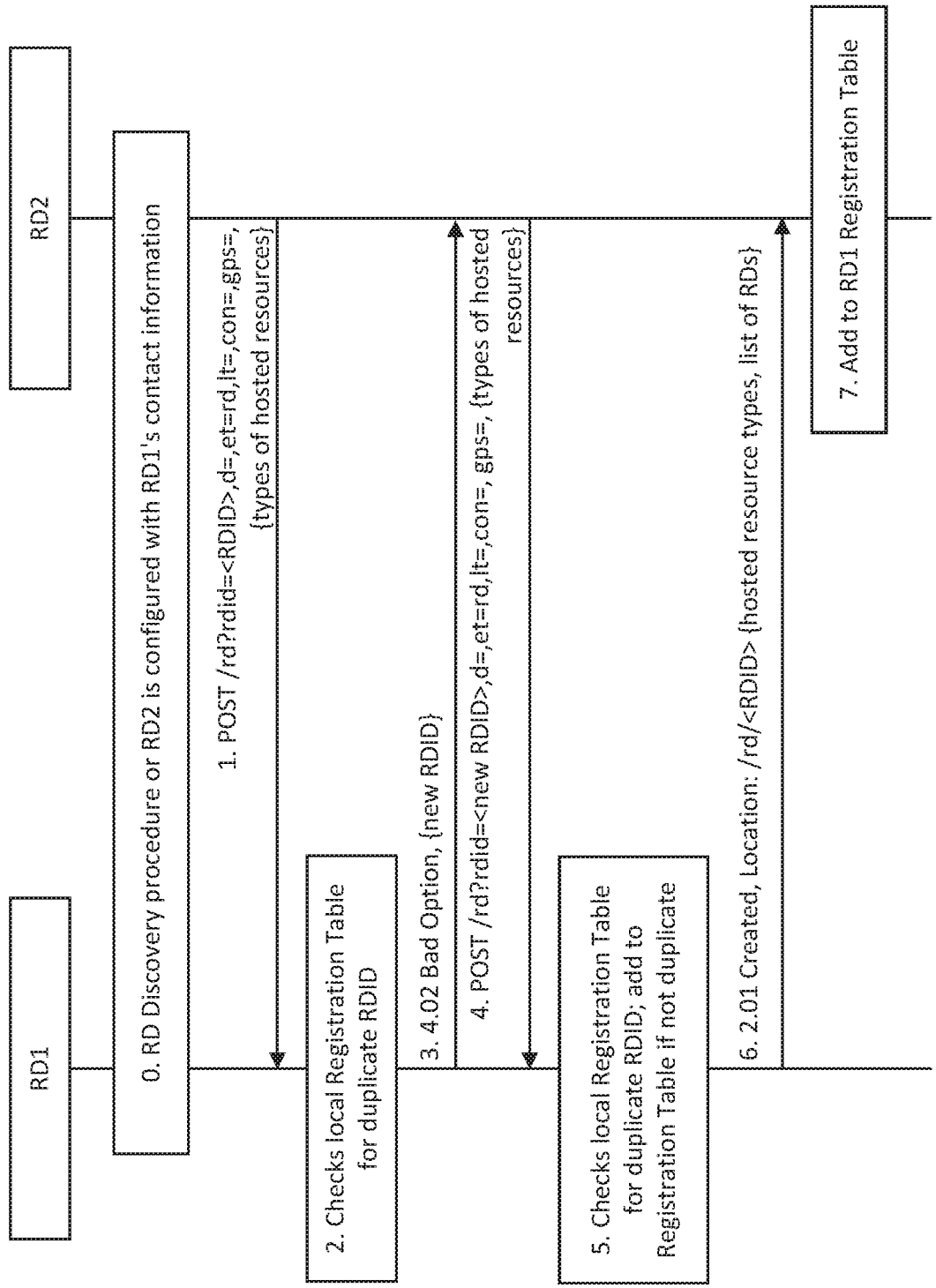
FIG. 15 shows an example call flow for a failed RD-to-RD registration response followed by a successful registration request using an RDID provided in the failed response.

FIG. 15 shows a failed RD-to-RD registration response where a new RDID is provided in step 3. Upon receiving the new RDID, RD2 generates a new registration message using the new RDID and executes steps 4 to 7, which is the same as steps 1 to 4 of FIG. 14.

Once an RD is registered to another RD, it is the responsibility of the registered RD to inform the registrar RD of changes to the endpoint and resource types it hosts. Similar to how an endpoint updates its registration to an RD, a registered RD should perform a similar update to the registrar RD. In the update, the registered RD should include

TABLE 3

Registrar RD Registration Table Example

| Entry # | RDID | Context | ParentRDID | Life-time (lt) | Resource Type (rt) | End-point Type (et) | Content Type (ct) | Geo-Fence area |
|---|---|---|---|---|---|---|---|---|
| 1 | 1.2 | — | 1 | <time> . . . , . . . , . . . | . . . , . . . | | 0, 40, 41 | <(gpsCoordinates), <radius> |
| 2 | 1.2.1 | <IP1> | — | <time> . . . , . . . | . . . , . . . , . . . | | 0, 40 | < . . . , . . . , . . . > |
| 3 | 1.2.2 | <IP2> | — | <time> . . . , . . . , . . . | . . . , . . . | | 0, 40, 41 | < . . . , . . . , . . . > |
| 4 | 1.2.3 | <IP3> | — | <time> . . . , . . . | . . . , . . . , | | 0, 40 | < . . . , . . . , . . . > |
| 5 | 1.5 | <IP4> | 1 | <time> . . . , . . . , . . . | . . . , . . . , . . . | | 0, 40, 50 | < . . . , . . . , . . . > |

After receiving the RD-to-RD Registration request, the registrar RD will determine if the request may be granted based on the RDIDs in its Registration Table. If there is no RDID entry matching the one provided by the registering RD in the local RD Registration Table, the registrar RD may accept the registration and return the registering RD's RDID in the response. This confirms the RDID was accepted and indicates a successful registration. In addition, the registrar RD may return the resource types (e.g. via a list of rt values) it hosts and a list of neighbor RD's context information the registering RD may be interested in registering to. The list of RD's context information is determined by entries in the Registration Table that matches attributes provided in the registration request. For example, if GPS coordinates were provided, the registrar RD may find a match with an RD whose geo-fence area covers the GPS coordinates of the registering RD.

A failed response is generated whenever the registrar RD is not accepting new registrations or if the provided RDID matches an entry in the local registration table. Various reasons for not accepting new registrations could be maximum capacity reached, an RD policy on which RDIDs to accept registration from, RDs having overlapping coverage of the same resource types, etc.

Figure 16:
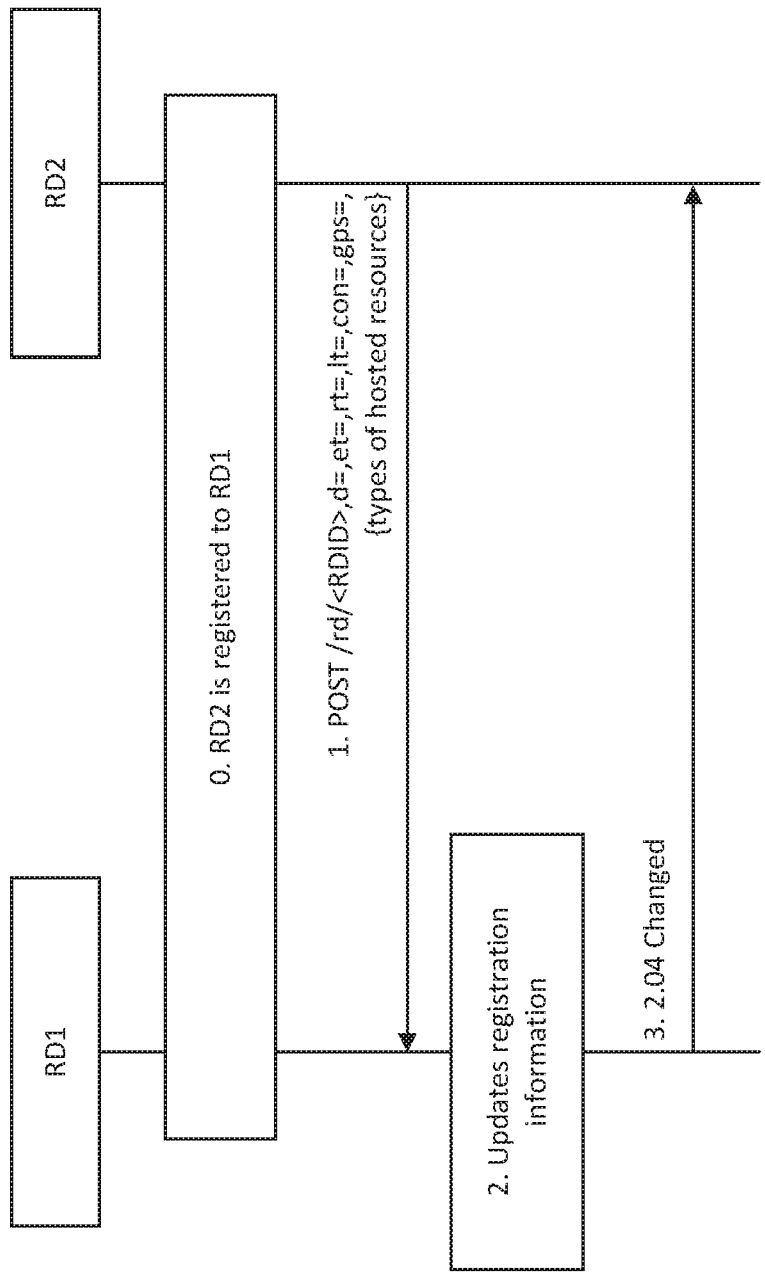
FIG. 16 shows an example call flow for an RD-to-RD Registration update method.

The registrar RD may provide one of the following responses for a failed registration. First, the registrar RD may provide a registration failed response with an error code changes to the resource and endpoint types it currently is hosting and other CoRE Link attributes it provided during registration. In addition, the lifetime (it) and context (con) attributes of the registering RD must be maintained so they do not expire or are different from what the registering RD is using respectively. The update of the resource and endpoint types are less critical and may be updated in regular intervals as opposed to when it happens in real time. The registrar RD in turn could report the updates to its registrar RD as well. FIG. 16 shows a generic RD-to-RD Registration update method. Compared to FIG. 5, additional Link attributes (e.g. et, rt, and gps) are included in the registration update request. As a result, RD1 updates registration information it keeps on RD2 in its Registration Table as shown in step 2.

Figure 17:
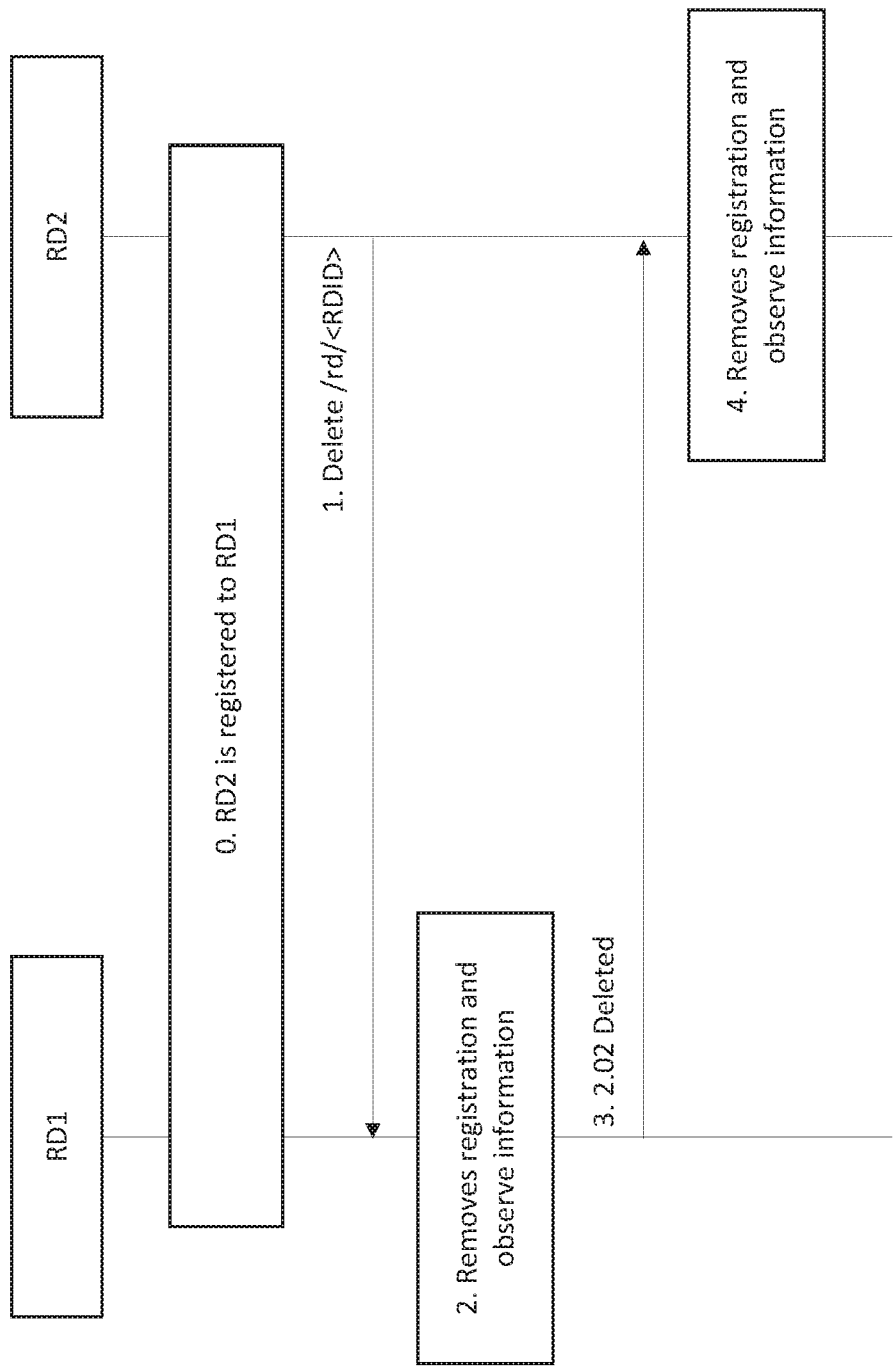
FIG. 17 shows an example call flow for an RD registration removal method.

The RD registration removal method follows exactly that of the endpoint registration removal method as shown in FIG. 6. FIG. 17 shows a generic RD registration removal method as well as the two actions that are performed within each RD—1) corresponding registration entries are removed, and 2) any corresponding observe entries are removed.

For many figures herein, some steps are not shown in order to more clearly highlight the different registration mechanisms. All the registration methods shown herein execute the same steps as those shown in FIG. 14 except that the processing step within each RD is not shown in the figures. In addition, there may be security implications with all the registration methods provided. The security implications are especially important when a parent RD registers to its child RDs in a bottom up deployment (e.g. when a SP builds the RD network by first deploying lower level RDs and followed by one or more level of parent RDs—see FIG. 10). In those cases, a token could be provisioned in all child RDs and the parent RD is required to provide the token during registration in order to register to the child RDs.

Figure 18:
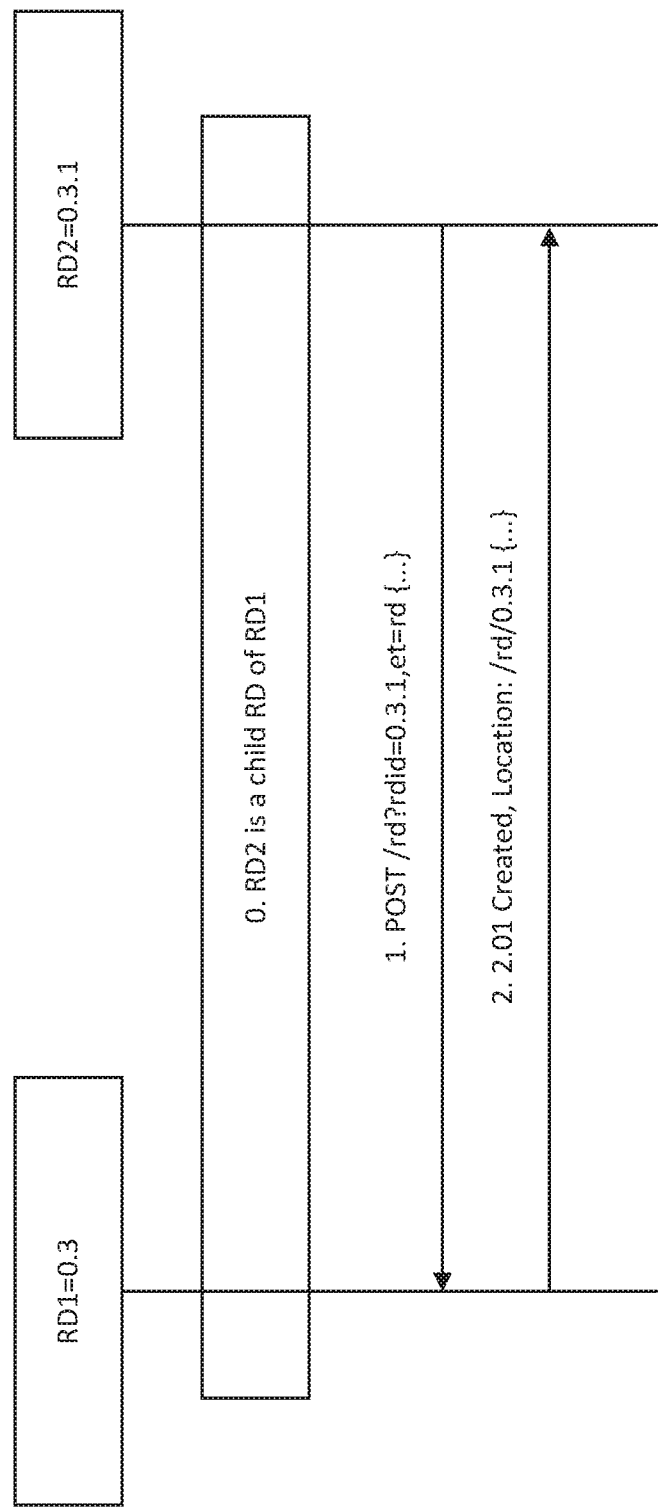
FIG. 18 shows an example call flow for a child RD registering to a parent RD.

The registering RD may operate as a parent or a child of the registrar RD. When registering, the RD may have its RDID fully provisioned, partially provisioned, or not provisioned at all. The registration request is the same in all the cases but the information provided and the resulting behavior of the registrar RD is different. FIG. 18 shows the Fully Provisioned RDID case in which RD2 is the child RD registering to the parent RD, RD1. This case is prevalent when an SP controls RD deployments and has total control over the provisioning of the RDID. RD2 is provisioned with an RDID that is a child of RD1. Since the SP controls the RDID assignment, there should be no conflict and RD1 should return a successful registration with the same RDID as provided by RD2.

Figure 19:
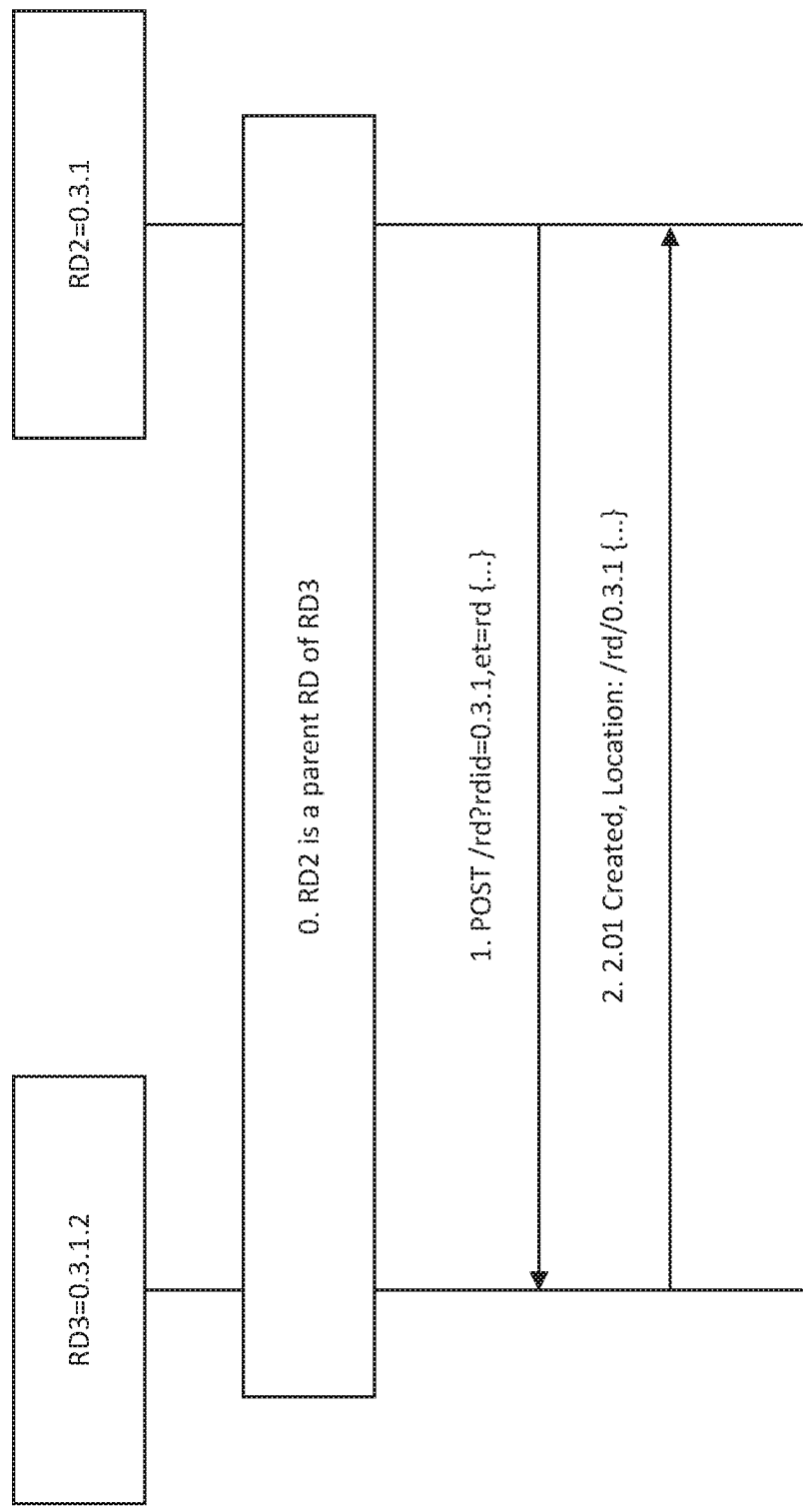
FIG. 19 shows an example call flow for a parent RD registering to a child RD.

Similarly, a registering RD may be fully provisioned but is a parent RD of the registrar RD. FIG. 19 shows this case in which RD2 is a parent RD of RD3. The RDID provided in the registration request has the same prefix as that of RD3's RDID and indicates that RD2 is the parent RD of RD3. This scenario depicts the case where the SP deploys the RDs in a bottom up manner, with the bottom being the child RDs.

Figure 20:
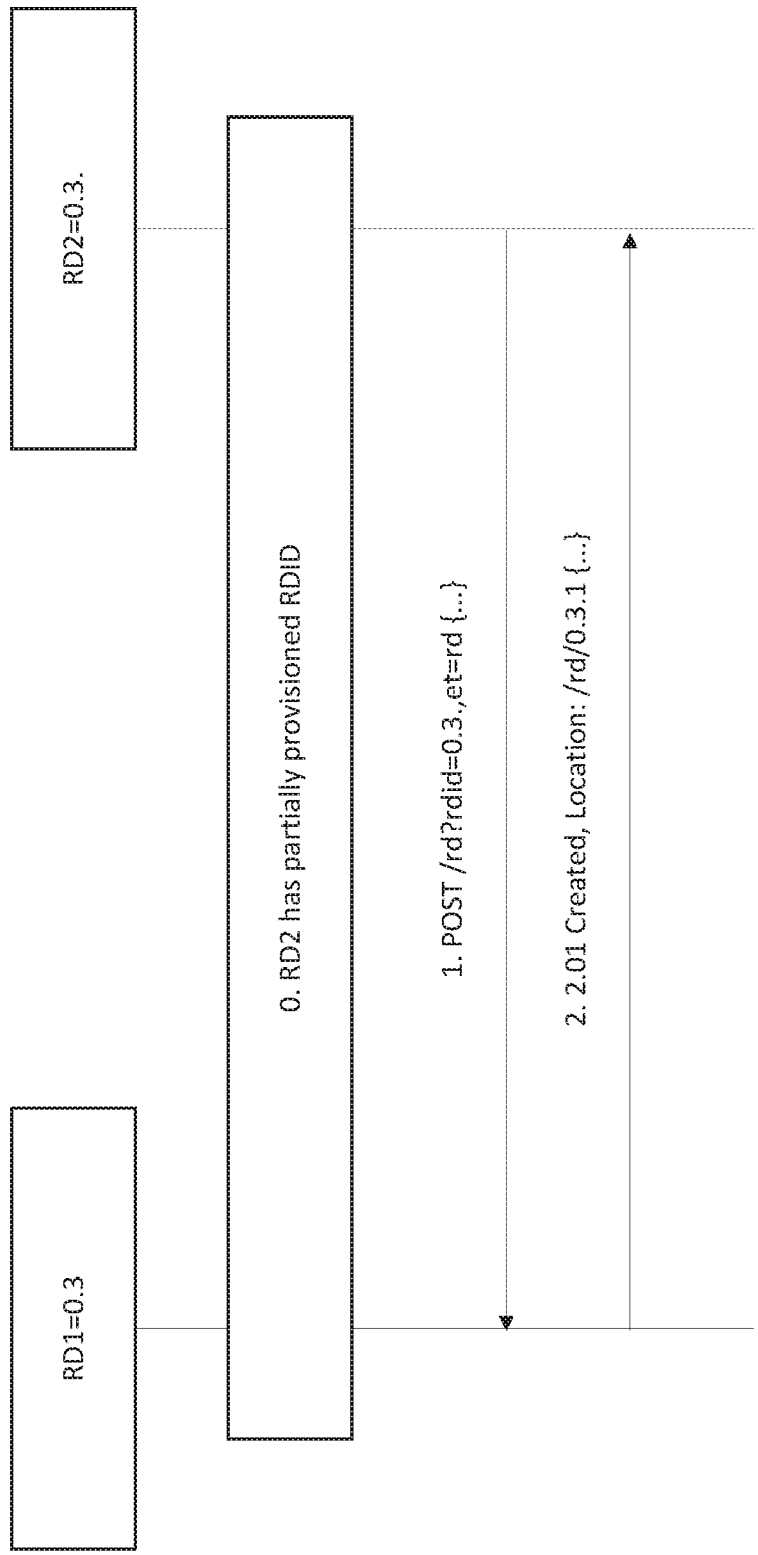
FIG. 20 shows an example call flow for registration using a partially provisioned RDID.

There are cases where a fully provisioned RDID is not available or desirable, e.g. RDID management for large systems. For these cases, the RD-to-RD registration method supports partially provisioned or non-provisioned RDIDs. FIG. 20 shows a partially provisioned RDID registration in which the registering RD2 provides an RDID prefix that matches the registrar RD1's prefix. RD1 may be managing a large number of RDs and upon receiving the partial RDID, RD1 may assign a suffix that is not found in the local RD Registration Table. This combination of the provided prefix and the assigned suffix would combine to form the entire RDID for the registration request. RD1 will then return the composite RDID in the response to RD2.

Figure 21:
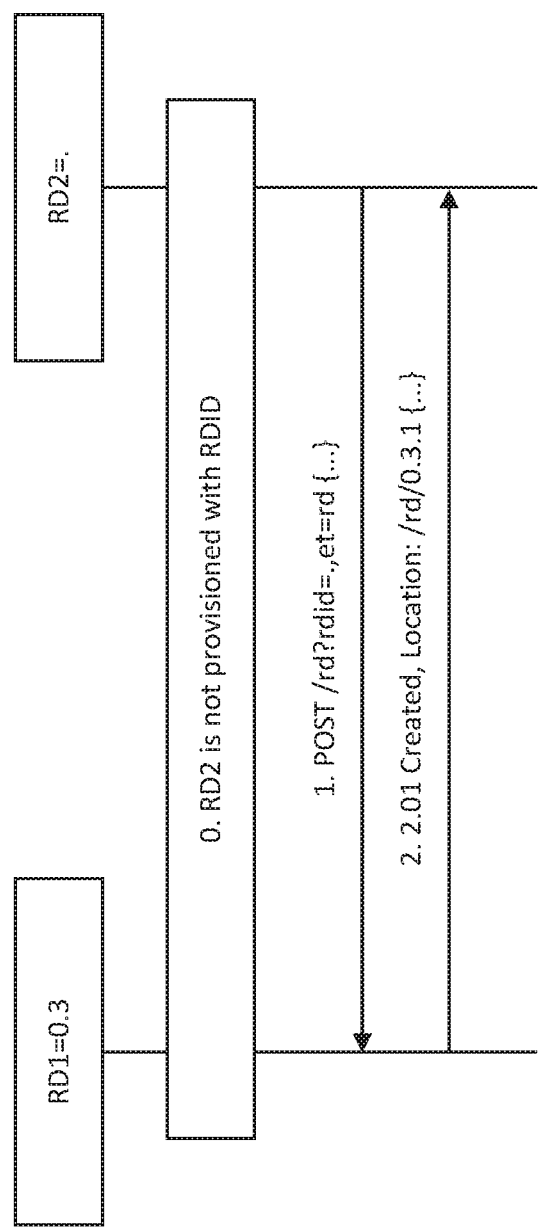
FIG. 21 shows an example call flow for a registration request without a provisioned RDID.

Finally, a registering RD may provide an empty RDID to indicate it wants to be assigned an RDID. Alternatively, the RDID could have an RDID value of "." instead as an indication of a request for RDID assignment. This approach is the preferred mechanism in large scale deployments as the RDID is auto-provisioned and are dynamically managed by registrar RDs. The RDID may be determined by the entries of the local registration table in each registrar RD. FIG. 21 shows the case in which the RDID has a "." value for the RDID attribute in the registration request. When RD1 receives such a request, it checks its local RD Registration Table to locate an available RDID that is not present in the table. The new RDID is added to the table and returned to RD2 to indicate a successful registration. Note the RDID returned should be a child RDID of the registrar RD to avoid potential RDID conflicts in future registrations. The reason is the registrar RD doesn't have the insight into which peer RDID is available and it does not know which parent RDID is valid. In ad-hoc deployments, the registrar RD may return any RDID but it may encounter RDID conflicts in the future as a result.

In a peer-to-peer scenario, the registering RD needs to provide an additional attribute called the "pRDID" or Parent RDID. This new attribute denotes the parent RD of the registering RD and is used to link the registering RD to its parent RD. Along with the parent RDID, the attribute also contains the context of the parent RD and as a result, the pRDID attribute is a complex attribute. The registrar RD may use the information provided in the pRDID attribute to perform the new RDID Validation Query method specified below. The method allows the registrar RD to verify with the parent RD (of the registering RD) the RDID provided by the registering RD. The inclusion of the pRDID attribute will help the registrar RD resolve conflicts with duplicate RDID in future registrations.

Figure 22:
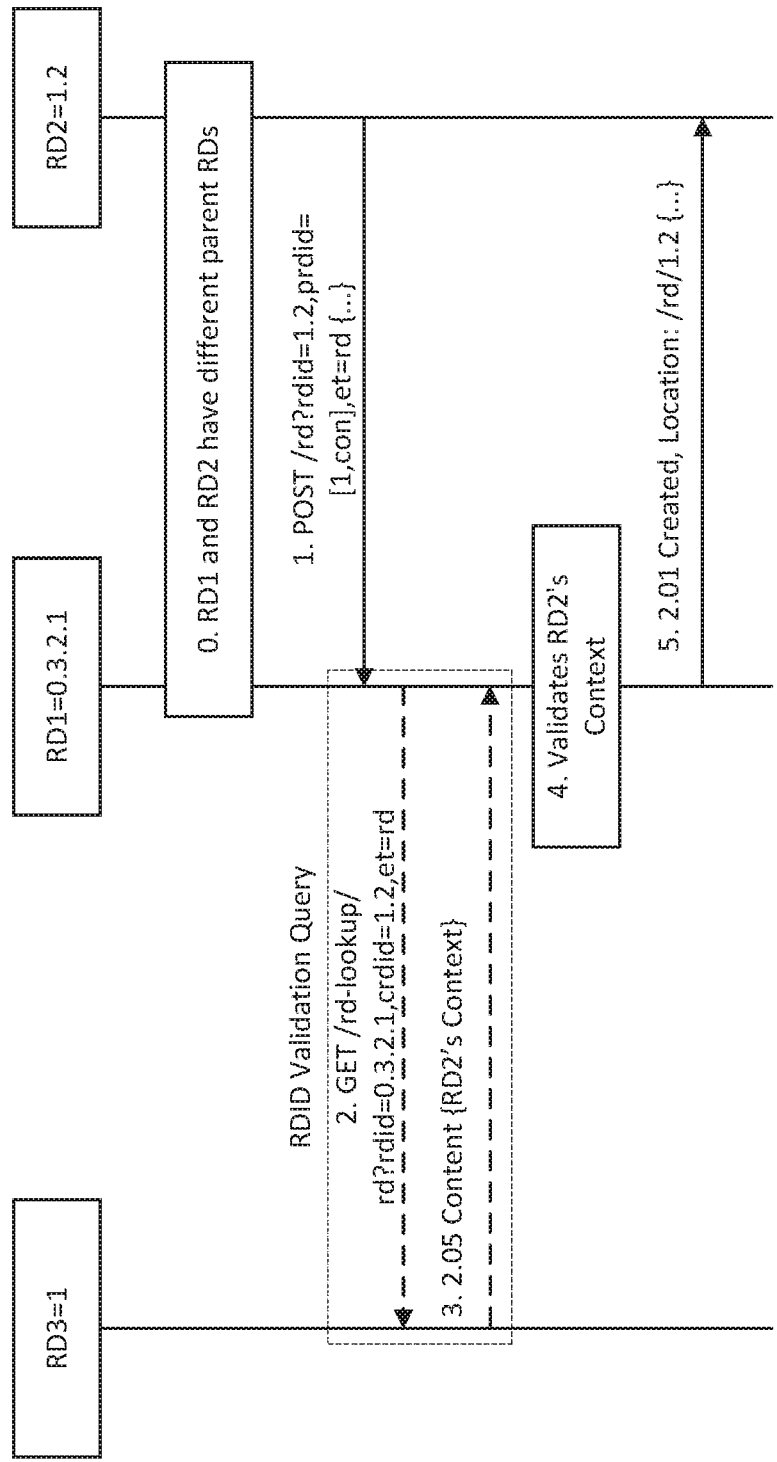
FIG. 22 shows an example call flow for a peer-to-peer registration request.

FIG. 22 shows an example call flow for a peer-to-peer registration request. This peer-to-peer RD-to-RD registration method includes an RDID Validation Query process. The validation method helps minimize RDID conflicts by having a third party validate the RDID of the registering RD. Recall, a child RD may only have one parent RD. This is only a simple validation; for a more robust solution, security mechanisms should be used instead. In this case, RD1 and RD2 have different parent RDs.

In step 0, RD1 and RD2 have different parent RDs.

In step 1, RD2 registers to RD1 and provides the pRDID attribute with the RDID and context information of RD3, the parent RD of RD2. RD1 obtains RD2's context information from the received message.

In step 2, using information from pRDID, RD1 performs the RDID Validation Query and sends a GET request targeting RD3's rd-lookup interface. Note the type of lookup is of type "rd" rather than the normal res, et, and rt provided by IETF RD draft and this type indicates an RDID validation query is being performed. In addition, RD1 provides a new attribute cRDID, which is the RDID of the child RD that is being verified. If RD1 cannot reach RD3, RD1 may decide to either proceed with the registration method or deny the request. This is left as an implementation policy for the design of RD1 and also may depend on the deployment scenario. In a structured deployment, the policy may be to deny the request; whereas an ad-hoc deployment may allow the registration.

In step 3, RD3 processes the GET request, locates RD2's register information, and returns RD2's context in the response to RD1.

In step 4, RD1 validates RD2's registration by comparing RD2's context from step 1 with that received from RD3 in step 3. Note, the request from step 1 contains the context of the parent RD (RD3) in the pRDID attribute. Furthermore, RD2's context information was obtained by RD1 in step 1. These two context information are different and represent context of RD3 and RD2 respectively.

In step 5, RD1 sends an appropriate response to RD2 based on the validation result from step 4.

If an RD does not have a parent RDID, then the RD sends a null entry for the pRDID attribute. This indicates that the registering RD is not registered to another RD. As a result, there will be no conflict with RDID. However, the registrar RD still checks the local registration table for duplicate RDIDs to ensure the RDID is unique. This may occur if the RDID is incorrectly configured or in ad-hoc scenarios where the RDID is provisioned by a different user or SP.

Figure 23:
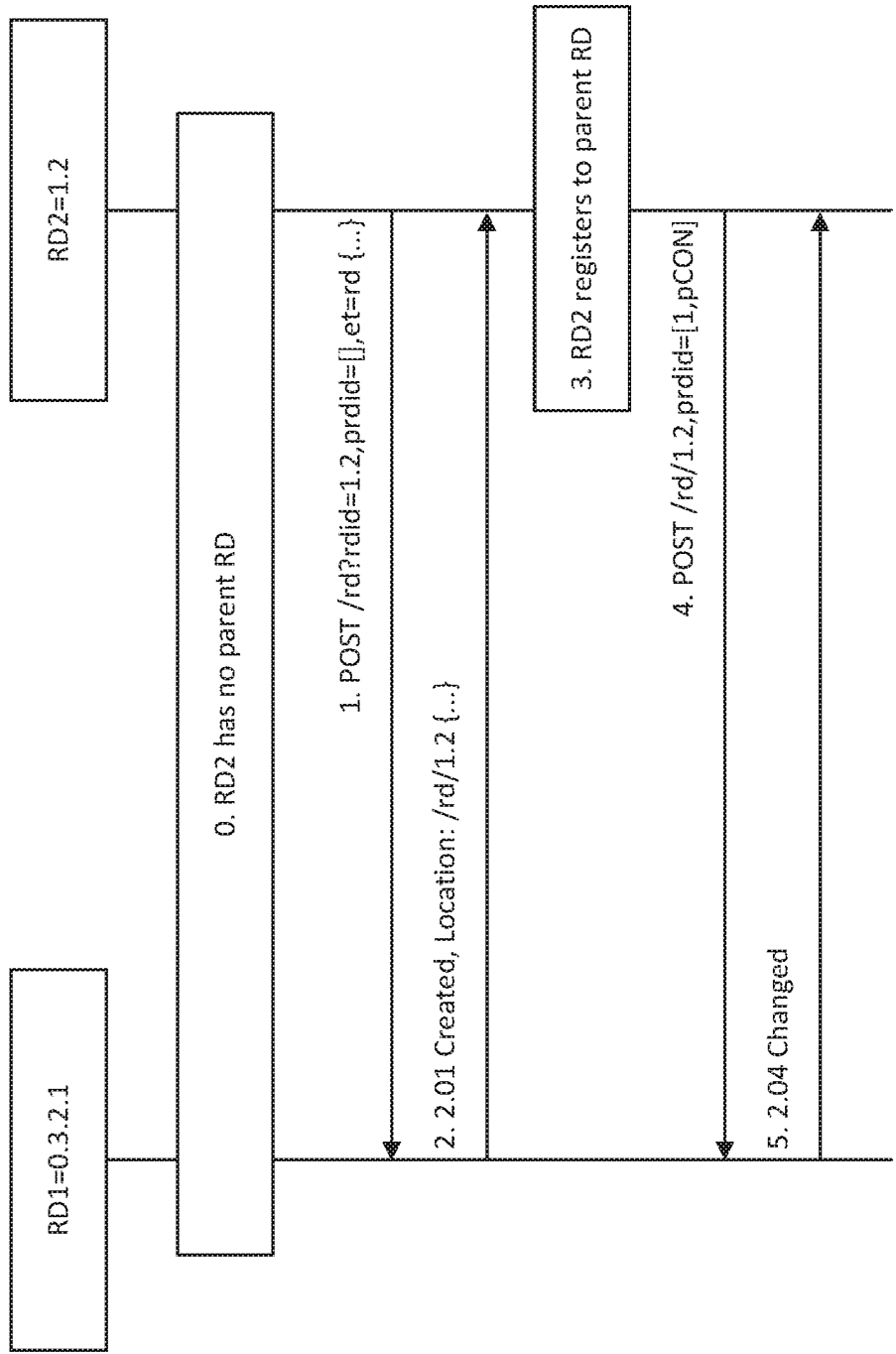
FIG. 23 shows an example call flow of a peer-to-peer registration update in which the pRDID is provided in the update request.

In the event that the RD registers to a parent RD in the future, an update to the previous registration needs to be performed. FIG. 23 shows the registration update method for this case. Initially, RD2 registers to RD1 without being registered to a parent RD. It provides its own RDID and an empty pRDID. Upon receiving the registration request, RD1 notices an empty pRDID attribute and hence it knows RD2 is not registered to any other RD. As a result, RD1 only needs to check for duplicate RDID against the ones in the local Registration Table. Sometime later, RD2 registers to a parent RD. After the successful registration, RD2 performs a registration update by using the POST method. This time, RD2 provides the pRDID associated with the new parent RD. Alternatively, the pRDID attribute could also be placed in the payload of the message if there are other attributes that needs update, e.g. for an update of the lifetime of the registration as well.

In step 0, RD2 has no parent RD.

In step 1, RD2 performs a registration request, providing an RDID of 1.2, an empty pRDID, and a list of resource types (rt) it hosts in the payload.

In step 2, RD1 checks its local Registration Table for duplicate RDID, finds the RDID is available, and returns a success response.

In step 3, after some time, RD2 registers to a parent RD. This could be triggered by a parent RD registering to RD2 in a bottom up deployment. In this deployment scheme, child RDs are deployed first. Then as the RD buildout progresses, parent RDs are deployed above the child RDs.

In step 4, RD2 then updates its registration on RD1 by providing the context of its parent RD.

In step 5, RD1 updates its Registration Table and sends an appropriate response to RD2.

Once RDs are registered to each other, existing RD lookups may be enhanced by having the receiving RD extend the search to all the RDs in its registration table, if necessary. The trigger of this Extended Search will depend on the search parameters provided by the client. New RD Query attributes allow clients to provide more criteria for enabling Extended Search. For example, if an RD client specifies a search for some particular resource type within a geo-fence area, then the receiving RD may extend the search based on the geo-fence area it has of all registered RDs in its Registration Table. Furthermore, RDs involved in the Extended Searches may provide RD Meta-data that provides more information about the search and/or resources. The receiving RD will then aggregate all search results together and return them to the client. Finally, an RD may also provide mechanisms for caching CoRE Links of other RDs using an enhanced version of the CoAP Observe functionality that are enabled due to RD-to-RD communications.

Figure 24:
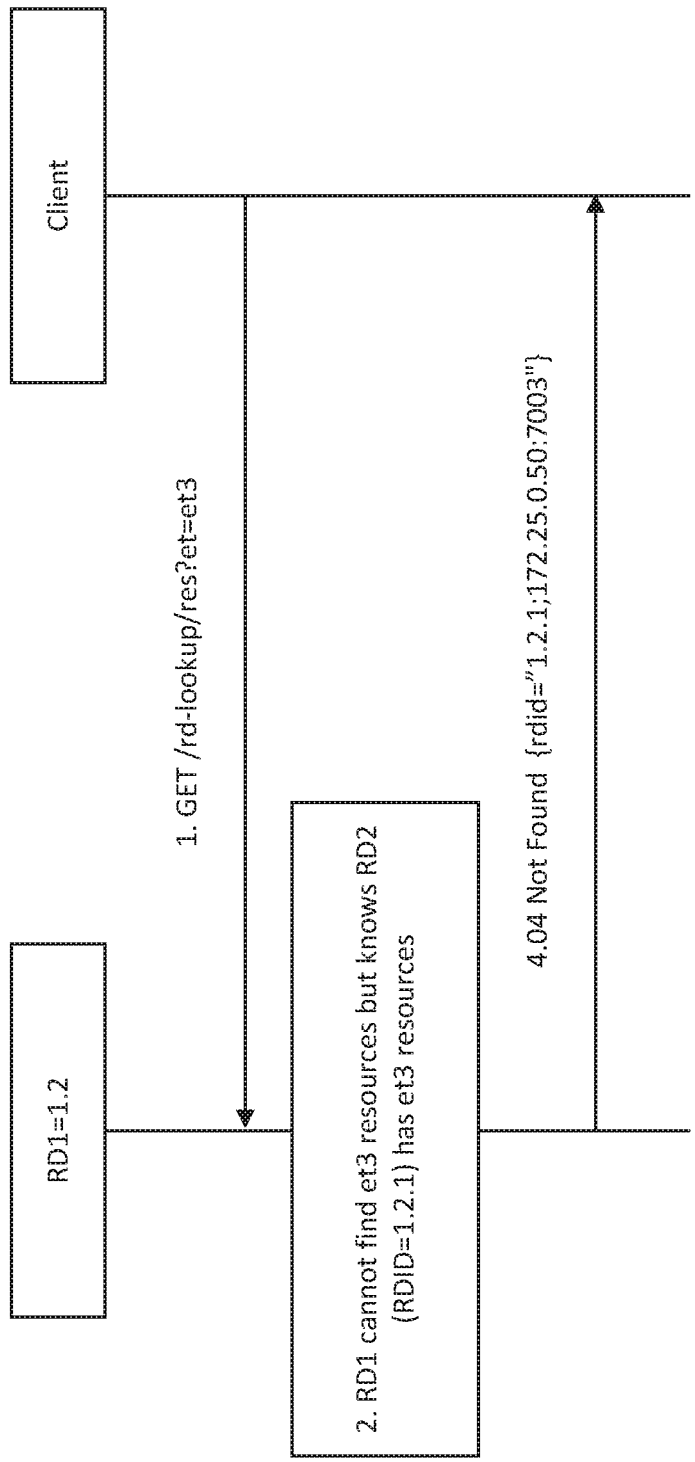
FIG. 24 shows an example call flow where an RD returns an enhanced RD lookup response which includes another RD's context information where the requested resource could be found.

In the case an RD is heavily loaded and is not able to execute an Extended Search on behalf of the client, the RD may return the context information of other RDs that contains Links the client is looking for. Then the client may issue another RD lookup query to the other RDs. FIG. 24 shows such a case in which RD1 returns a 4.04 Not Found response code but includes another RD's context information along with the associated RDID. RD1 knows of RD2 as a result of RD2's registration to RD1.

Figure 25:
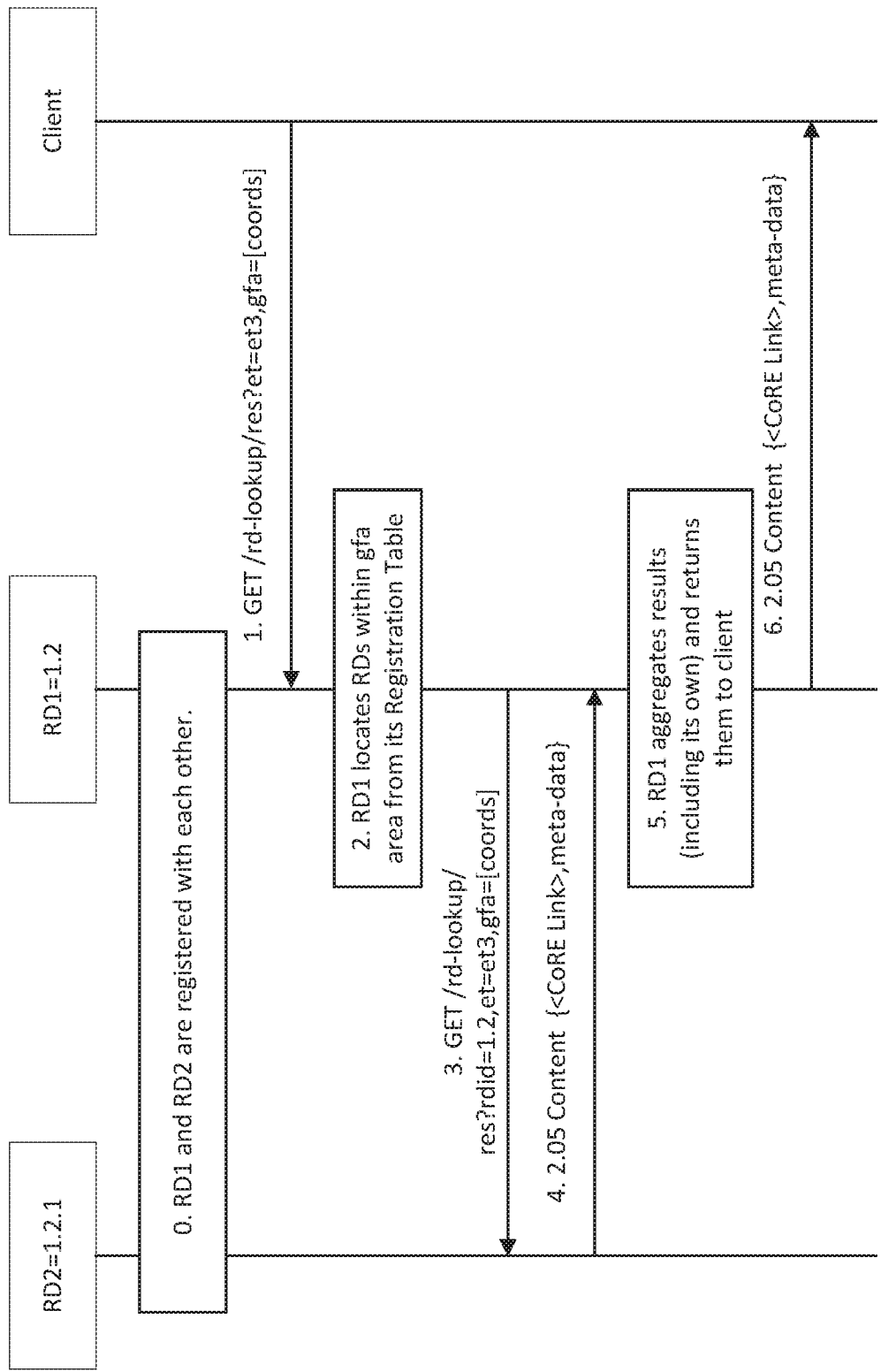
FIG. 25 shows an example call flow of an RD lookup query using Extended Search capability.

When an RD client searches for CoRE Links of resources, an RD may now expand the search to include CoRE Links from other RDs that are registered to it. A client may insert RD Query attributes to trigger the expanded search, which is referred as an RD Extended Search. The RD Query attributes provide additional parameters a client may use to specify parameters for use in enhanced RD lookups. For example, if a client provides the geo-fence area (gfa) attribute, the receiving RD may use this information and check against all registered RDs in its Registration Table to make a determination of which RDs to send the Extended Search. FIG. 25 shows an example of how the enhanced RD Lookup Query would work. The RD Extended Search provides clients the ability to specify RD Query attributes in lookup requests and for RDs to return RD Meta-data in the lookup responses.

In step 0, RD1 and RD2 are registered with each other.

In step 1, an RD client performs an RD Lookup towards RD1 searching for a particular endpoint type that resides in a certain geo-fence area as specified by the RD Query attribute gfa=[(gpsCoords1), (gpsCoords2), (gpsCoords3), (gpsCoords4)], which is a new search criteria for the RD Lookup interface. In addition, other RD Query attributes could be included to direct the RD on what additional information is requested in the response and how to extend the Extended Search. These may include the number of RDs to search, whether to include the RDIDs associated with CoRE Links in the search response, an endpoint registration lifetime cutoff, the number of levels of RD hierarchy to limit the search, a response time requirement, the number of CoRE Links to return, etc.

In step 2, using the information provided in its Registration Table pertaining to geo-fencing, RD1 may identify RDs that fall within the geo-fence area. Combined with other search parameters the client may have provided, RD1 creates a list of RDs with which to send Extended Searches to.

In step 3, using the list obtained in step 2, RD1 sends Extended Searches to all the RDs on the list. As part of the Extended Search request, RD1 includes its own RDID with a set of RD Query attributes that may or may not be the same ones provided by the client. Certain RD Query attributes such as the geo-fence area are passed along in the Extended Search while other RD Query attributes such as the number of CoRE Links to return are not passed along.

In step 4, RD2 returns the list of CoRE Links that matches the search criteria. In the response, RD2 may include RD Meta-data for the RD Query attributes sent in step 3. This may include GPS coordinates of the endpoints, the remaining lifetime, etc. In addition, RDs should include the RDID with the associate CoRE Links to identify where the Links are hosted in the responses. This will allow the Extended Search's aggregator RD the ability to identify duplicate CoRE Links and remove them before responding to the client.

In step 5, RD1 aggregates the responses from all the RDs with its own list of CoRE Links that meet the criteria of the original lookup request. In cases where the Extended Search produce results from the same RD, RD1 may easily detect this by finding duplicate RDIDs and only aggregating the duplicates as a single set of results.

In step 6, RD1 returns the aggregated list of CoRE Links to the client and may include any RD Meta-data that gives the client more information about the Links. The meta-data could include the GPS coordinates of the endpoints, the RDID of the RD that hosts the CoRE Links, etc.

Table 4 show examples of RD Query attributes that may be used by RD clients in performing enhanced RD lookups and the RD Meta-data that could be returned during Extended Searches. The table lists the attributes and meta-data that are applicable to the corresponding steps outlined in FIG. 25.

TABLE 4

Examples of RD Query Attributes and Meta-Data for used in Extended Searches

| Meta-Data (Abbreviation) | Description | Applicable in Step | | | |
|---|---|---|---|---|---|
| | | 1 | 3 | 4 | 6 |
| RD Query Attributes | | | | | |
| numRD | Limit the number of RDs in performing Extended Searches | x | | | |
| numLinksLimit | Limit the number of CoRE Links that is returned in the response | x | | | |
| includeRDID | Include the RDID associated with CoRE Links in the response | x | | | |
| rspTimeReq | Perform Extended Search within the response time specified | x | x | | |
| gfArea | Geo-fence area | x | x | | |
| gpsCoords | GPS coordinates of the endpoints where the x resource resides | x | | x | x |
| regLTCutoff | Registration lifetime cutoff specifies a threshold to limit the Extended Search based on the remaining lifetime of endpoint registrations. In other words, an RD should enable Extended Search to return only the endpoint registrations whose remaining lifetime is above the threshold provided. | x | x | | |
| epAwake | Limit search for endpoints that are awake | x | x | | |
| RD Meta-data | | | | | |
| cacheResource | A resource that may be cached at a remote RD | | | x | |
| remainLT | The remaining lifetime of the endpoint associated with the resource | | | x | x |
| RDID | The RDID of the RD that hosts the indicated endpoints associated with the resource. | | | x | x |
| resCache | A cached copy of a resource from another RD | | | | x |

As shown by Table 4, there are two types of RD Query attribute and another two types of RD Meta-data. RD Query attributes are provided on an RD's Lookup Interface to provide finer grain search criteria. The first type of RD Query attribute are attributes used between a client and an RD, as shown by the Step 1 column in Table 4. The second type of RD Query attributes are those used within RD-to-RD communications. These are provided by RD-to-RD during Extended Search. These are just categories for the RD Query attributes and some may in fact be considered as both types. Similarly, there are two types of RD Meta-data as well. The categories are similar to RD Query attributes: RD to client, and RD-to-RD. The RD Meta-data provides contextual information about the results returned by an RD, whether it is for another RD or for a client.

A benefit of the parent-child architecture occurs during Extended Search in which a child RD may forward a client query to a parent RD and let the parent RD forward the requests to other child RDs. This mechanism is especially useful whenever a comprehensive search is required and may also minimize latency in certain situations. For more time critical queries, the querying RD may want to communicate directly to its peer RDs to get responses as quickly as possible.

Through the course of operation, an RD may determine certain CoRE Links are more popular than others by their presence in the aggregated results provided to responses of multiple, but different queries. Alternatively, an RD may be presented the opportunity to store remote endpoint registration and their respective CoRE Links through the RD Meta-data cacheResource provided in the Extended Search responses. This meta-data indicates that a CoRE Link may be cached on the receiving RD. An RD may then initiate an unsolicited request to observe the CoRE Links by performing an enhanced CoAP Observe as outlined in FIG. 26. In this case, RD1 is interested in observing CoRE Links on RD2 after a previous Extended Search showed the Links are cacheable. The RD is initiating this request not due to a client query but through its own determination that the Links are popular and the RD would like to cache a copy of the Links in its local repository. The method is as follows.

In step 0, RD1 and RD2 are registered with each other.

In step 1, RD1 sends a GET request to RD2 with an Observe option and a list of CoRE Links in the payload that it is interested in observing. The GET request in this case is different than a typical Observe request in that the target URI is not one of the observed resources. Rather, it is a typical RD client query targeting the RD Lookup Interface. The CoRE Links provided in the payload corresponds to the "resources" that the requestor wants to observe. Included in the request are RD1's RDID and a token for the observation. The observe token in this case applies to the requesting RD and not to each observe resource. As a result, observed CoRE Links may be added or removed using the same token. Only when all the CoRE Links associated with an RD are removed will the token be removed. Various mechanisms could be used to indicate the enhanced Observe functionality: 1) the inclusion of an RDID, 2) the list of CoRE Links in the payload of the GET request, or 3) the addition of an enumeration to the Observe option.

In step 2, RD2 responds with the response code "2.05 Content", the token, an Observe sequence number, and a list of endpoint registration with their respective CoRE Links that are observed. This specifies that RD2 will notify RD1 of changes to the registration state of the endpoint registration and their CoRE Links.

In step 3, RD1 saves the CoRE Links listing provided by RD2.

In step 4, RD2 receives a request from an endpoint to update registration lifetime associated with the CoRE Link(s). This triggers an observe event and requires RD2 to notify RD1 of the change to the registration state of the CoRE Link(s).

In step 5, RD2 sends a notify message with the response code of "2.04 Changed" along with the token, observe sequence number, and the changed CoRE Link(s). In normal Observe behavior, the notify message will contain the response code "2.05 Content" instead. This is due to the fact that the original Observe functionality is interested in the contents of a resource. The RD's use of Observe centers on the fact that the RD is interested in the registration state of the CoRE Link(s) and not the contents of the CoRE Links. (If the contents of the CoRE Link(s) were to change, the normal Observe "2.05 Content" response code will be sent.) As a result, the response code of an Observe notify message will be used to indicate how the RD should treat the cached copy of the CoRE Link(s). In this case, an update is required as the CoRE Link registration state has changed.

In step 6, RD1 updates the cached CoRE Link(s) provided by RD2.

In step 7, after some time, the endpoint deletes the CoRE Link(s) from RD2. This triggers another observe event.

In step 8a, RD2 sends another notify message but this time, the response code is "2.02 Deleted". The response code reflects the fact that the CoRE Link(s) was (were) deleted in step 5.

In step 8b, optionally, RD2 may proactively remove the observe entry of any CoRE Link that is no longer being hosted. Alternatively, RD2 may wait for RD1 to cancel the observation either through a RESET message as shown in step 10b or by an explicit Cancel Observe message as described in RFC 7641.

In step 9, upon receiving the notify message from step 8a, RD1 removes the cached CoRE Link(s).

In step 10a, optionally, RD1 may send a RST message to cancel the observation.

In step 10b, RD2 removes the observe entry.

Notice that the notify responses in steps 5 and 8a are not the typical 2.05 Content Observe response. The reason for this is the RD's use of Observe is different than that of typical observe clients. Whereas typical observe clients are interested in the state of a resource (i.e. the value), RDs are interested in the registration state of the CoRE Links. This important distinction requires that the response codes for an RD observe should give the registration status of the CoRE Links. As a result, 2.04 Changed and 2.02 Deleted responses are provided. The response code in these cases will direct the receiving RD on how to process the cached CoRE Links.

New parameters, attributes, and meta-data described herein may be used in both the Resource Directory communications outlined in RFC 6690 CoRE Link as well as for new operations described herein, such as new RD Query operations. New CoRE Link and RD Query attributes may be used to support RD-to-RD communications, for example. New RD Meta-data may be returned during Extended Search operations.

The RDID attribute is an opaque string used to identify an RD as part of RD-to-RD communications. The RDID consists of a sequence of numbers delimited by the character ".", such as "1.2.3". For matching purposes, the entire string must be matched exactly on a per character basis. Only one value is allowed within the attribute and it must not appear more than once in a link. The RDID may be fully provisioned, partially provisioned, or not provisioned at all. In the latter two cases, the registrar RD will provision the necessary components of the RDID to the registering RD.

Similar to the RDID, the pRDID attribute is an opaque string that identifies an RD for RD-to-RD communications. The pRDID identifies an RD that is the parent RD of the RD that presents this link attribute. It follows the same matching requirements, value multiplicity, and single appearance in a link as the RDID. The pRDID is used in peer-to-peer RD-to-RD registration and is required for RDID validation. The registering RD provides the pRDID attribute when registering to a peer RD.

Similar to the RDID, the cRDID attribute is an opaque string that identifies an RD for RD-to-RD communications. The cRDID identifies an RD that is the child RD of a parent RD indicated for RDID validation. It follows the same matching requirements, value multiplicity, and single appearance in a link as the RDID. The cRDID is used in peer-to-peer RD-to-RD registration and is required for RDID validation. The registrar RD provides the cRDID attribute during RDID Validation Query method.

An RD client may provide a "number of RDs" (nrd) query attribute to limit the number of RDs used for Extended Searches. A value of zero indicates to the RD that the client only wish to query the local RD and that Extended Searches should be disabled. A non-zero value indicates the number of RDs to include in the Extended Search. This attribute is typically used when an RD client is only interested in searching surrounding resources near the client.

An RD client may provide a "number of links limit" (nll) attribute to limit the number of CoRE Links the RD returns. A client may not be able to handle parsing a big list of results, or may not support CoAP block transfers. The nll attribute may be used when the search is targeted with many query attributes and the client is expecting a small number of resources to meet the search criteria. In those cases, the attribute provides for a more comprehensive search while limiting the results returned.

An RD client may provide an "include RDID" (iri) query attribute to request that RDIDs be included in the response to a search. Depending on the search results, the resource URIs may be found from multiple RDs. As a result, multiple RDIDs may be included in the search response to the client. This added information in the lookup response may help clients better track the popularity of an RD in terms of resource URIs hosted.

An RD client may provide a "response time requirement" (rtr) query attribute to limit the time an RD has in performing Extended Search. The time provided could either be an absolute or relative time and upon expiration, the RD must return the search results to the client. A client will use this attribute to get timely responses and does not care that the results are not comprehensive.

An RD client may provide a "geo-fence area" (gfa) query attribute to limit an RD's search within the geo-fence area specified. The attribute may be complex. In Examples 1 and 2 below, the values are delimited within square brackets. The 'gfa' attribute may also be considered a Link attribute. The attribute may consist of some combination of GPS coordinates and geometric shape to describe the area, e.g. circle, rectangle. Some examples are:

Example 1

Circle: gfa=[circle;<gpscenter>;<radius>]

Example 2

Rectangle: gfa=[rectangle; <gpstopLeft>; <gpsbottomLeft>; <gpsbottomRight>; <gpstopRight>]

An RD client may provide a "registration lifetime cutoff" (rlc) query attribute to selectively search an RD for resource URIs whose endpoint has a certain level of time remaining in its registration to an RD. The attribute could contain either an absolute or relative time that is remaining on an endpoint's registration lifetime. This attribute may be used in cases where a client is looking to access the resource of an endpoint at a later time and wants to ensure the endpoint is still available, for example.

An RD client may provide an "endpoint awake" (epa) query attribute to indicate to an RD to only search for resource URIs whose endpoints are awake up at s time specified in the attribute, for example. The attribute could contain either an absolute or relative time that an endpoint is awake for. This attribute may be used in cases where a client is looking to access the resource of an endpoint immediately after getting the search response.

An RD may provide a "load capacity" (lc) meta-data in a response to an RD Discovery request to indicate the loading of the RD. Such meta-data may include a percentage of the full capacity the RD have in terms of hosting CoRE Links, for example. A higher percentage could indicate the RD is popular but also it is loaded and may incur longer processing delays.

An RD may provide a "cache resource" (crs) meta-data during RD-to-RD communications to indicate resources it returns to another RD is cacheable. In return, an RD may need to perform RD Cacheable Resource Synchronization method using enhanced Block Observe.

An RD may provide GPS coordinates (gps) meta-data during RD-to-RD communications to include location data of resources that are returned in response to lookup requests. The values may be complex and consist of GPS coordinates of the endpoint where the resource resides. Note that the 'gps' attribute may also be considered a Link attribute. This meta-data may be returned if the indicated resource falls within the 'gfa' area specified by the lookup query, for example.

An RD may provide "remaining lifetime" (rlt) meta-data during RD-to-RD communications to provide remaining lifetimes of endpoints that host the indicated resources. This meta-data may be returned in response to the 'rlc' Query attribute, for example.

An RD may provide a "resource cache" (rsc) meta-data during RD-to-RD communications for resource URIs that are cached copies of the original resource URI residing in a different RD. This meta-data may be useful especially in the case when an RD client includes the 'nrd' query attribute to limit the number of RDs queried for an extended search, for example.

The following examples show some usage of the aforementioned attributes and meta-data. In the interest of brevity, some internal RD processing steps may be omitted to highlight the salient features shown by each example.

Figure 27:
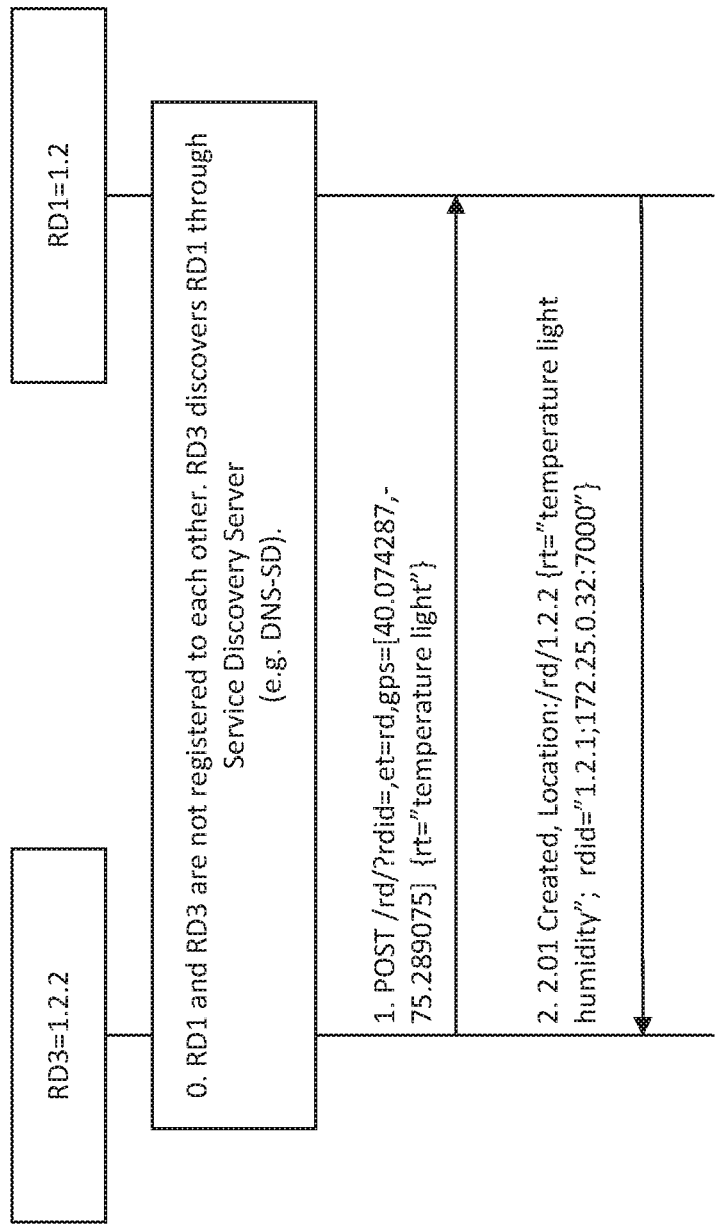
FIG. 27 shows an example call flow where a child RD registers without providing an RDID attribute.

FIG. 27 shows an example of a parent-child registration in which the child RD, RD3, is registering to RD1 with an empty RDID attribute, i.e. no RDID is provided. In step 0, RD3 performs Service Discovery to locate the context information of RD1. In step 1, using the context information obtained from step 0, RD3 sends a registration request with the empty RDID, its GPS coordinates, and the resource types (rt) RD3 hosts. In step 2, RD1 then returns a 2.01 Created response with the assigned RDID 1.2.2, a list of rt RD1 hosts, and another RD with the associated context information that RD3 may be interested in registering to.

This case shows the streamlined registration mechanism of a parent-child registration that could be used to deploy RDs in a large scale deployment. The parent RD manages the RDID provisioning and provides for dynamic RD registration without the issue of RDID conflicts. RD owners or service providers do not need to manage the pre-provisioning of RDID for the many RDs that are deployed.

Figure 28:
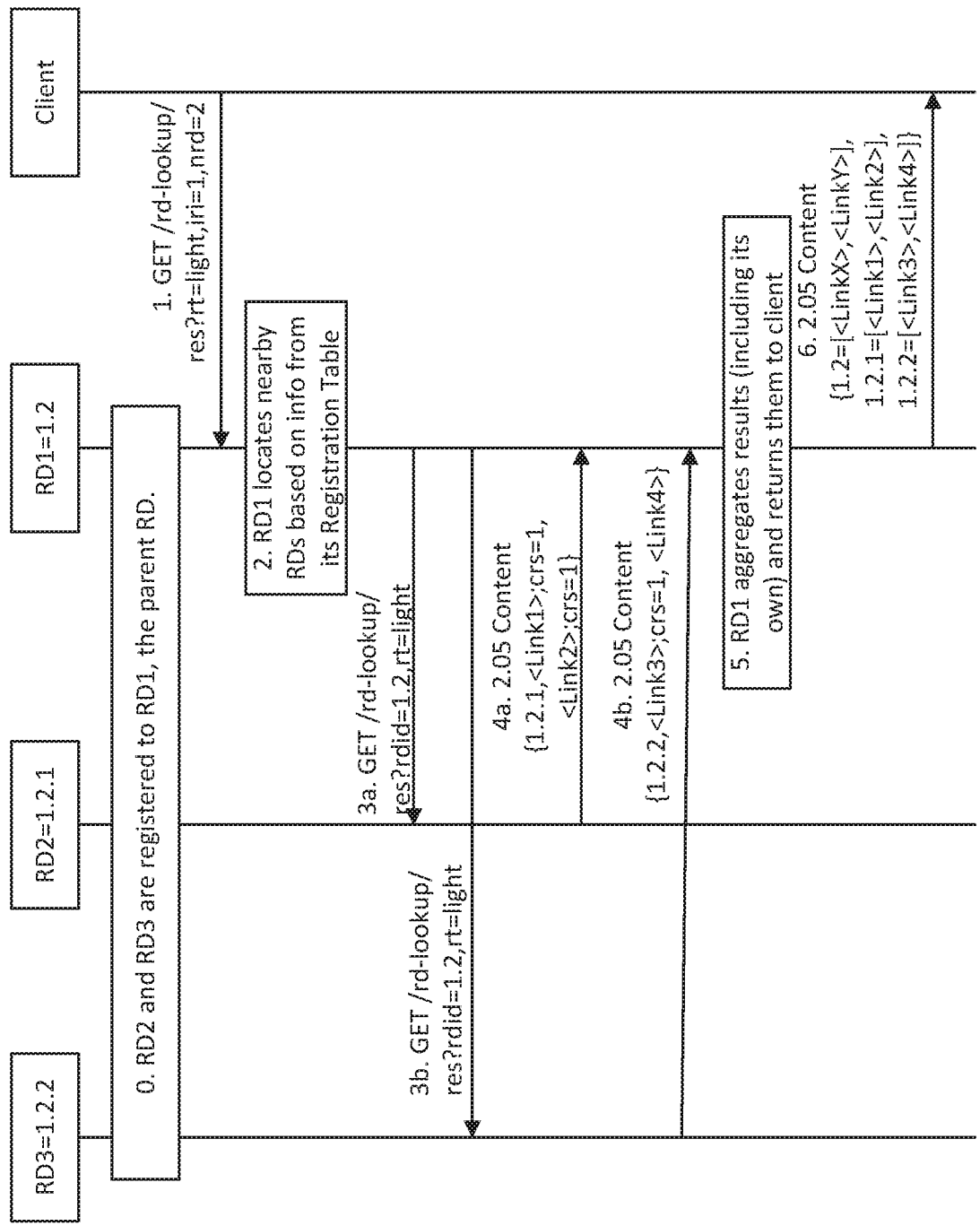
FIG. 28 shows an example call flow for the use of an RD extended search.

FIG. 28 shows an example of the use of RD Extended Search enabled by RD-to-RD communications. In step 0, RD2 and RD3 both register to RD1, the parent RD. In step 1, a client performs an RD query to RD1 searching for the resource type (rt) "light". In the query, the client specifies the iri and nrd attributes with values of 1 and 2 respectively. In the case of iri, a value of 1 enables the inclusion of RDID in the results to the client query, while an nrd value of 2 specifies that the client wants to limit the Extended Search to two RDs.

In step 2, RD1 searches its Registration Table for RDs that host the "light" resource type. Using the nrd value as a guide, RD1 selects the 2 RDs matching the search criteria. If RD1 finds more RDs matching the search criteria than the nrd attribute, RD1 may still include the extra RDs in the Extended Search as to provide the most results to the client and filter the results to limit them to two RDs, for example.

In steps 3a and 3b, RD1 sends an appropriate query to RD2 and RD3, respectively. Note that the nrd attribute is not included in the requests sent in steps 3a and 3b. This type of RD Query attribute is only available on client queries, i.e. between a client and an RD. Other RD Query attributes may also be used as part of attributes in the Extended Search, such as the gfa and the rtr attributes. The presence of RDID indicates to RD2 and RD3 that this query is from an RD rather than a client.

In step 4, RD2 and RD3 return the results of the corresponding queries in steps 4a and 4b. The results include the RDID of either RD2 or RD3 as well as the list of CoRE Links that match the query criteria. Within each CoRE Link, the crs attribute may be included for Links that are cacheable by RD1. This attribute is referred to as the RD Meta-data that may be returned by an RD's Lookup Interface. Within this type, there are two sub-types: ones that are provided in RD-to-RD communications (e.g., crs) and others that are returned to the client (rsc). Once again, some RD Meta-data may be classified as both.

In step 5, once all the responses are received, RD1 aggregates the results into a final report to send to the client. Included in the report are results from searches from RD2 and RD3 as well as results from RD1 internally.

In step 6, depending on the RD Query attribute provided in step 1, RD1 may need to format the report sent to the client. In this case, iri was enabled and as a result, RD1 includes the RDID with the associated CoRE Links in the response. In the payload of the response, the Links associated with RD1 are listed first, followed by Links for RD2, and finally, the Links for RD3. Note that the crs attribute is not part of the links. This is due to the fact crs is an RD-to-RD only meta-data. RD1 is informed by RDs2 and 3 that certain Links are cacheable if the crs attribute is set to 1. In the example, Links 1, 2, and 3 are able to be cached by RD1 while Link 4 is not.

Figure 29:
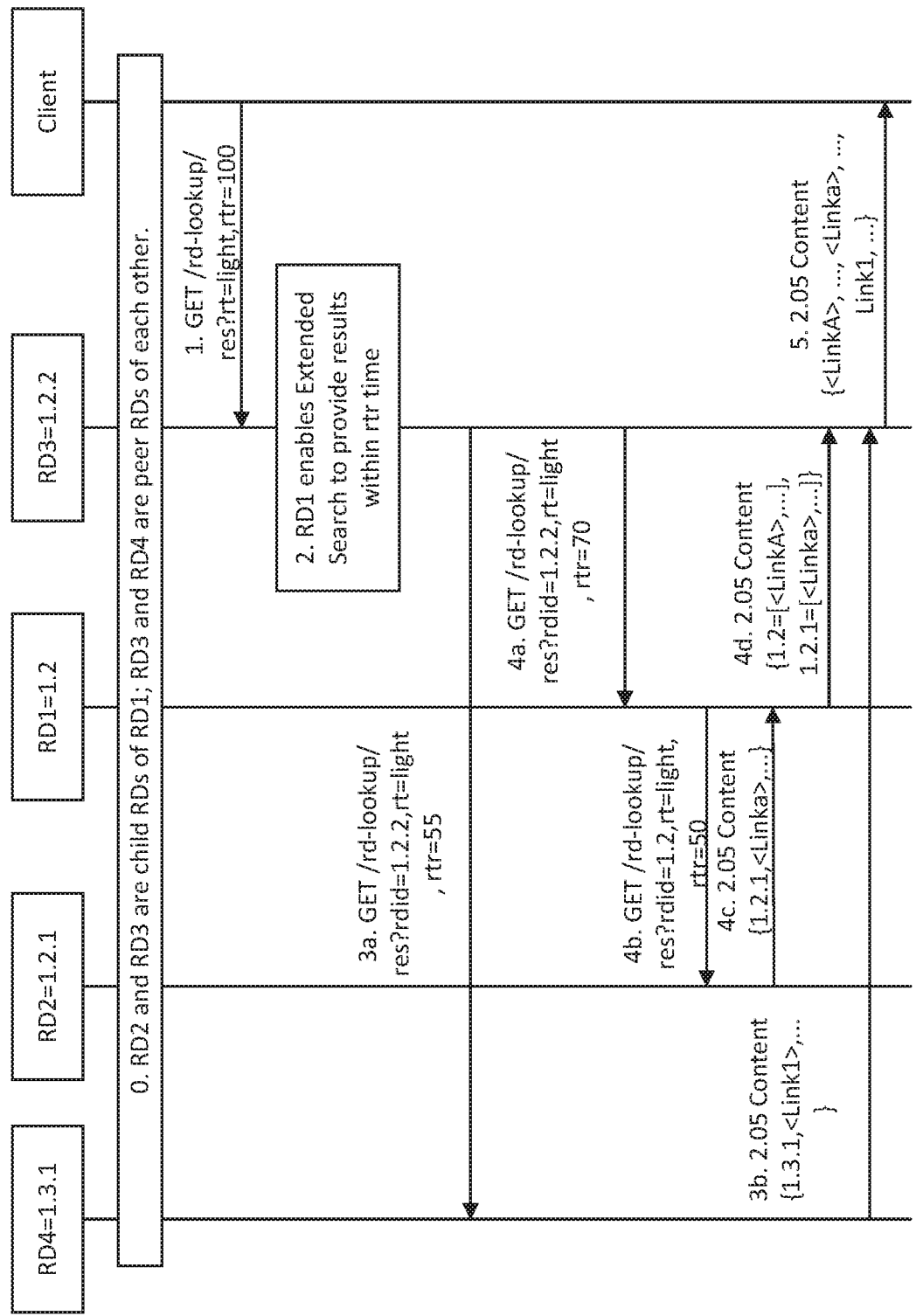
FIG. 29 shows an example call flow for an RD extended search that spans multiple hops.

FIG. 29 shows another example of an Extended Search but this time, the search is spanned across multiple hops. The client in this case performs a query on RD3, which along with RD2 are child RDs of RD1, i.e. both RD2 and RD3 are registered to RD1. In addition, RD3 is registered to RD4 as peer RDs but RD3 is not registered to RD2. This example highlights the fact the Extended Search capability may span multiple hops while still meeting a response time requirement placed by the client using the rtr RD Query attribute.

In step 0, RD3 is registered to RD1 as a child RD and RD4 as a peer RD. RD2 is also registered to RD1 but RD2 and RD3 are not registered to each other. RD4 is not registered to RD1.

In step 1, the Client performs a query for light resource type and specifies a response time requirement (rtr RD Query attribute) for the query.

In step 2, RD3 searches its Registration Table and makes a determination to include RD1 and RD4 in the Extended Search.

In step 3a, RD3 sends a GET request to RD4 with an rtr value that is lower than the one provided by the client to account for processing delays.

In step 3b, RD4 is not able to expand the search to its child RDs and as a result, returns only the Links it hosts along with its RDID.

In step 4a, RD3 sends another GET request to RD1 but with a larger rtr value as it is closer to RD1 than RD4. The rtr value may be calculated based on some algorithm programmed within the RD or through some empirical information obtained from previous communications.

In step 4b, RD1 expands the Extended Search to include RD2 and forwards the GET request it receives but with a lower rtr value.

In step 4c, RD2 returns a list of CoRE Links that matches the resource type light to RD1 along with its RDID.

In step 4d, RD1 aggregates its own results with those received from RD2 and returns them to RD3. The results are grouped according to RDID.

In step 5, RD3 aggregates the results from steps 3b and 4d with its own results and send them to the client. If RD3 detects duplicate RDIDs from different responses, it may remove one set of CoRE Links from the response that is sent to the client. RD3 is filtering the results so the client does not received duplicate CoRE Links.

FIG. 25 shows an example where the gfa RD Query attribute is used to limit the search to a certain geo-fence area specified by "coords", and the gfa attribute is used to limit the RD Extended Search to only RDs within a geo-fence area. The gfa query attribute is classified as both client to RD and RD-to-RD query attribute as it is used in both queries, as shown in steps 1 and 3. RD1 determines the RDs to include for step 3 by comparing the given gfa to the information in its local Registration Table. In the example, only one RD, RD2, falls in the area specified by gfa and hence only one request is sent out for Extended Search. If RD2 has an entry in its local Registration Table, it also may extend the search to include the RD associated with that entry. That is the benefit of allowing RD-to-RD communications—the search criteria may be enhanced to target a specific resource a client is looking for while getting a level of comprehensive results.

As described in RFC 7641, the CoAP Observe functionality allows a CoAP client to register to get notifications on changes to resources hosted by a CoAP server. The notification that is returned from the CoAP server provides data on the state of a resource and contains a "2.05 Content" code. In the context of RD communications, the Observe notification is enhanced to indicate an action to be performed on a cached CoRE Link based on the response code provided, as described, e.g., in reference to FIG. 26.

Figure 26:
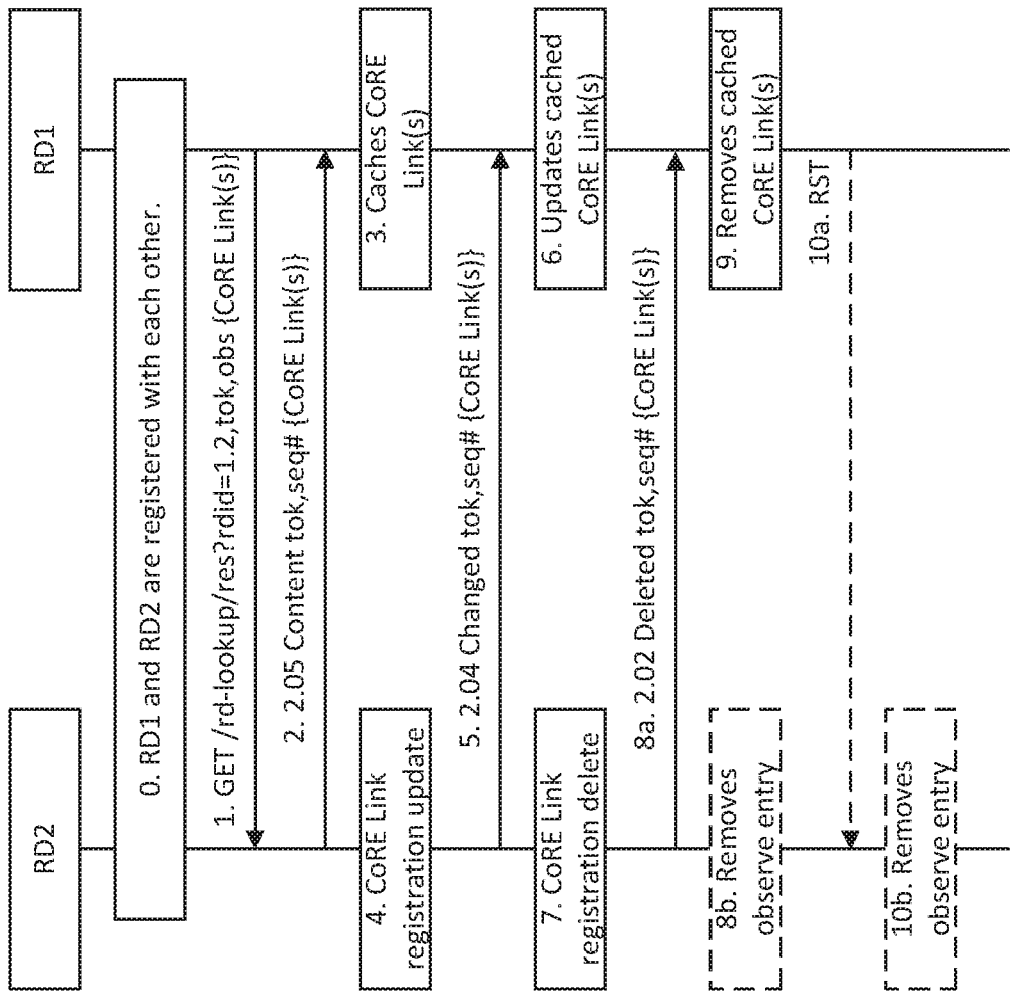
FIG. 26 shows an example call flow whereby an RD may initiate an unsolicited request to observe a CoRE link from another RD.

FIG. 26 outlines the usage of CoAP Observe from the perspective of RD communications. RD1 is interested in caching one or more CoRE Links residing in RD2 and performs an observe registration in step 1. The inclusion of an RDID indicates to RD2 that the GET request is requesting the enhanced Observe notifications, as described, e.g., in reference to FIG. 26. Alternatively, the presence of CoRE Links in the payload of the GET message may be used to indicate enhanced Observe notifications are requested. Finally, a third alternative is to enumerate the Observe option to request the enhanced notifications. The Observe option value may be modified as shown in Table 6-1.

TABLE 6-1

CoAP Observe Option Value Enumerations for Enhanced Notifications

| Observe Option Value | Enumeration | Description |
| --- | --- | --- |
| 0 | Register | adds the entry to the list, if not present |
| 1 | Deregister | removes the entry from the list, if present |
| 2 (new) | Register (for enhance notifications) | adds CoRE Link(s) to the list and enable enhanced notifications |

Figure 30:
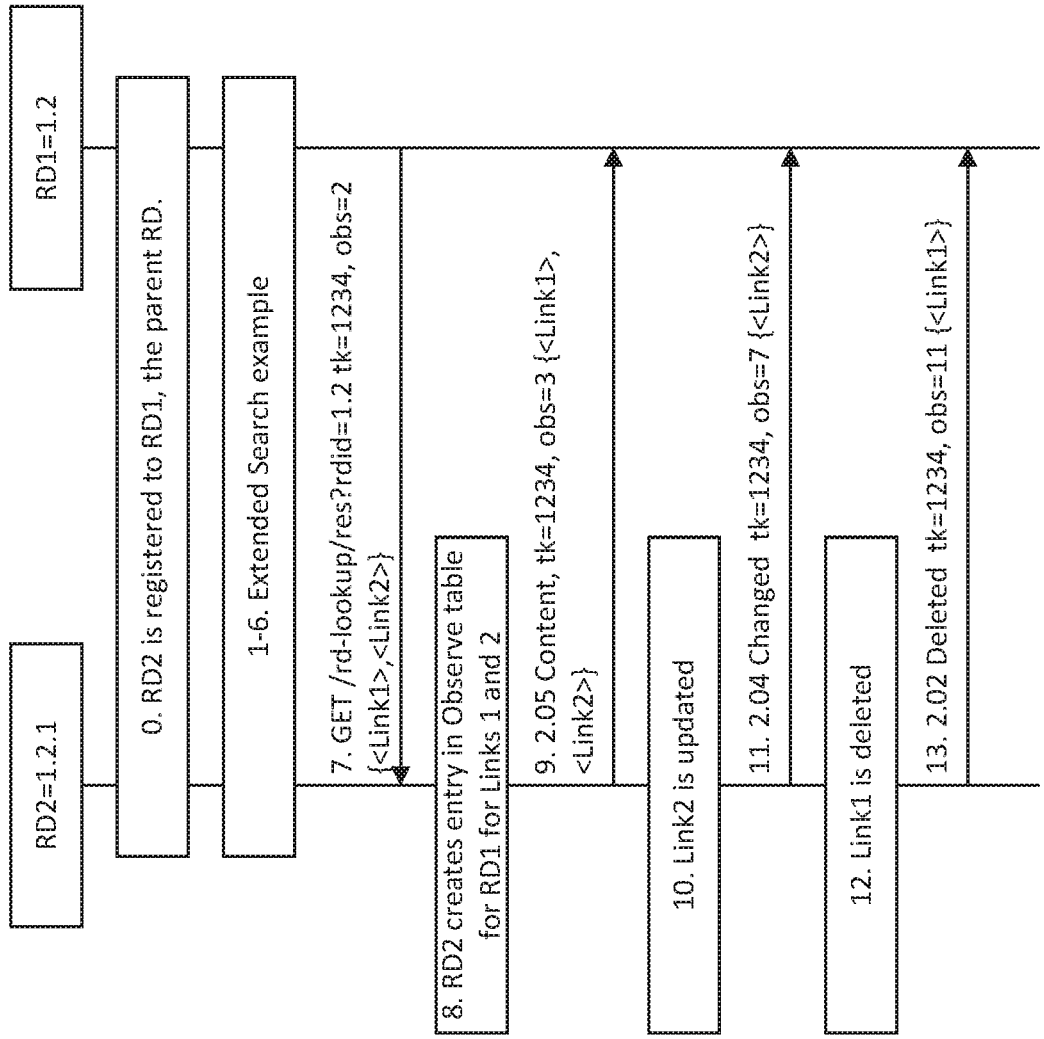
FIG. 30 shows an example call flow for enhanced observe notifications.

FIG. 30 shows an example of a new Observe functionality. The example builds upon the example from FIG. 28 but only focuses on the interactions between RD1 and RD2 and continues on after steps 1 to 6 have been executed.

In step 0, RD2 and RD3 both registers to RD1, the parent RD. Note RD3 is not shown in FIG. 30.

In steps 1-6, the method of FIG. 28 is executed. The important step for this example is the return of the crs RD Meta-data in steps 4a and 4b of FIG. 28.

In step 7, RD1 performs an observe request on the cacheable Links 1 and 2 by including them in the payload of an Observe request. Note the use of the new Observe registration mechanism as denoted by an Observe value of 2. In addition, the token (tk) 1234 applies to both Links 1 and 2.

In step 8, RD2 creates an entry in its Observe table using the token 1234 and adds Links 1 and 2 for RD1. All RD1 observe requests will use this token; however, RD1 may also create another observe request with a different token. The use of multiple tokens by the same RD is useful for grouping Links together. This is an implementation decision—a simplify implementation may limit only one observe token per RD while a more feature rich implementation may allow multiple observe tokens for the same RD.

In step 9, RD2 sends a 2.05 Content response to RD1 indicating the Observe request was granted. The same token as in the request and an observe sequence number are provided in the response. Included in the payload is the list of granted Links—the list may consist of all Links in the request or a subset of the Links, e.g. if the observe table is full when trying to add all the Links in the request, only Links that were successfully added are returned while Links not added are not included in the response.

In step 10, Link2 is updated.

In step 11, RD2 sends a 2.04 Changed notify message to RD1 with the contents of Link2 in the payload. The same token and an incremented observe sequence number are included with the response. Note this is where the behavior of the Observe response is different from typical Observe behavior—the response code indicates how RD1 needs to process the information in the payload rather than merely providing the content. RD1 updates its cached copy of Link2.

In step 12, Link1 is removed.

In step 13, RD2 sends a 2.02 Deleted response to RD1 indicating the need for removing the cached Link. Once again, the behavior here is different than existing Observe behavior. RD1 removes its cached copy of Link1.

Figure 31:
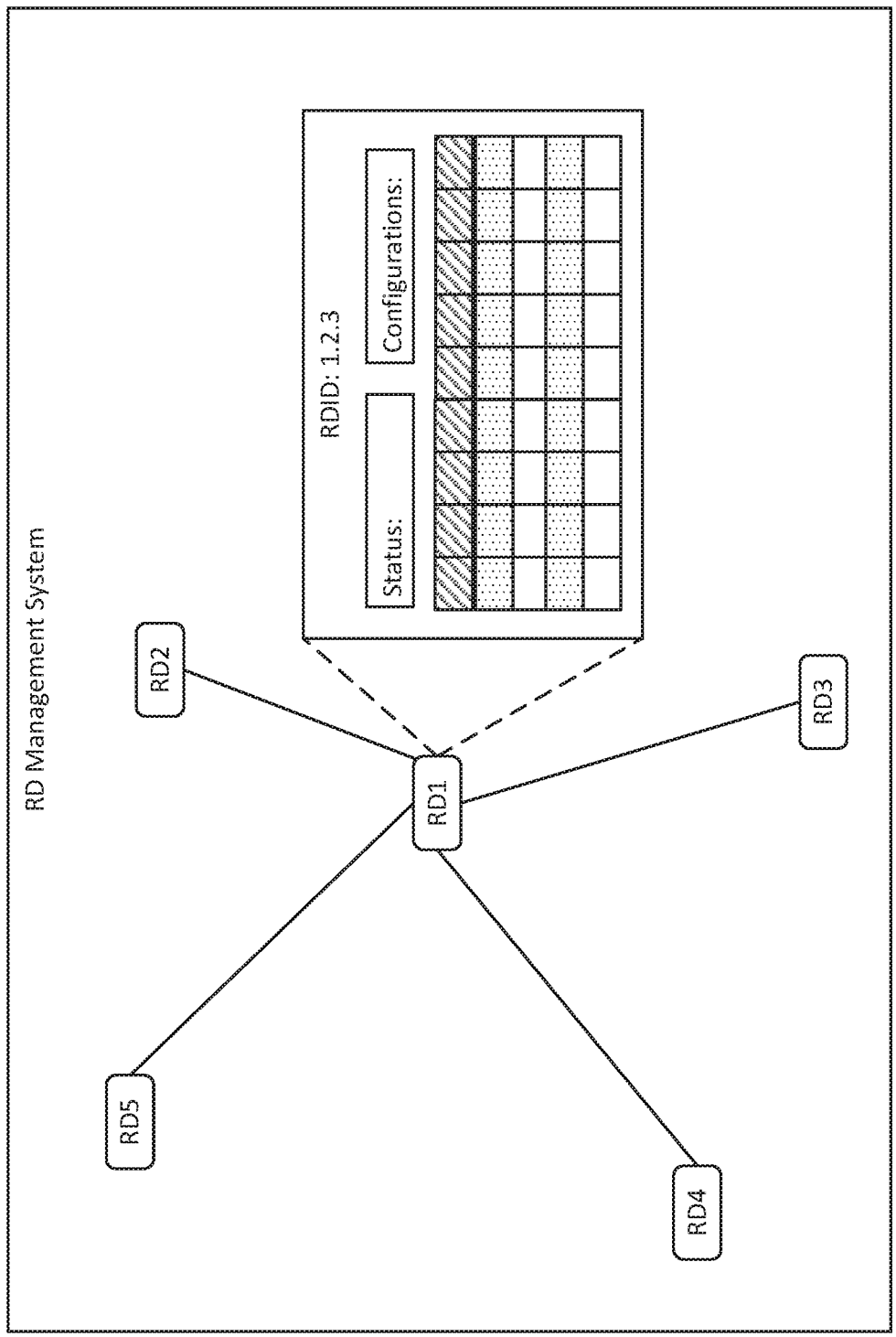
FIG. 31 shows an example graphical user interface for an RD registration table.

FIG. 31 shows an example user interface of an RD Registration Table, as described, e.g., in reference to Table 3. The user interface shows the layout of RD interconnections and the registration relationships among the RDs. A user may touch one of the RD icons to select it and a dialog window pops up. Within the window, a heading shows what RDID is associated with the selected RD. In addition, two GUI boxes show the status and configurations for the current RD. Finally, a table appears at the bottom portion of the window that is similar to Table 3. The table shows the registration relationships between the selected RD and other remote RDs.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 32:
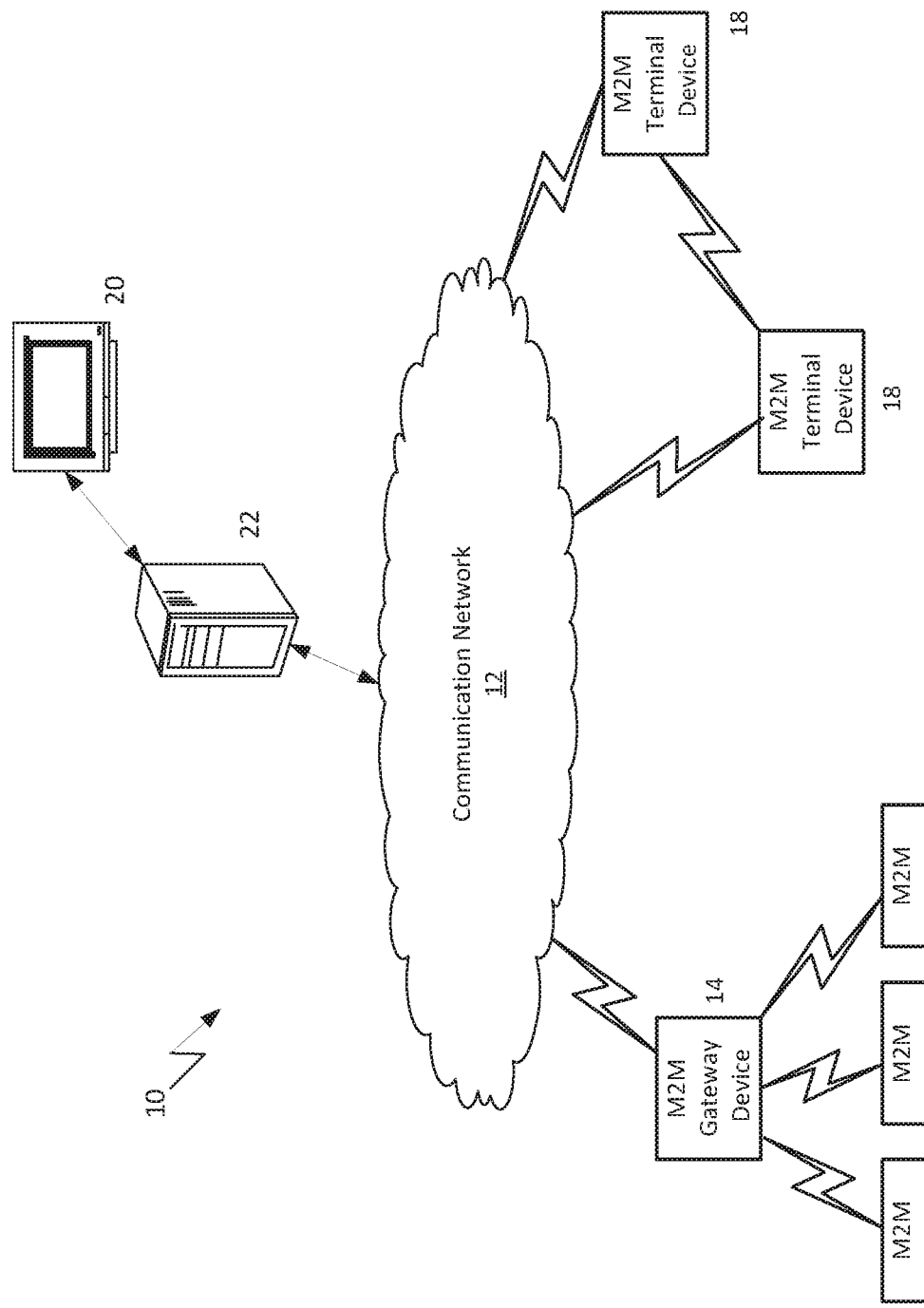
FIG. 32 is a system diagram of an example machine-to-machine (M2M), Internet of Things (IoT), or Web of Things (WoT) communication system in which one or more disclosed embodiments may be implemented.

As shown in FIG. 32, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 33:
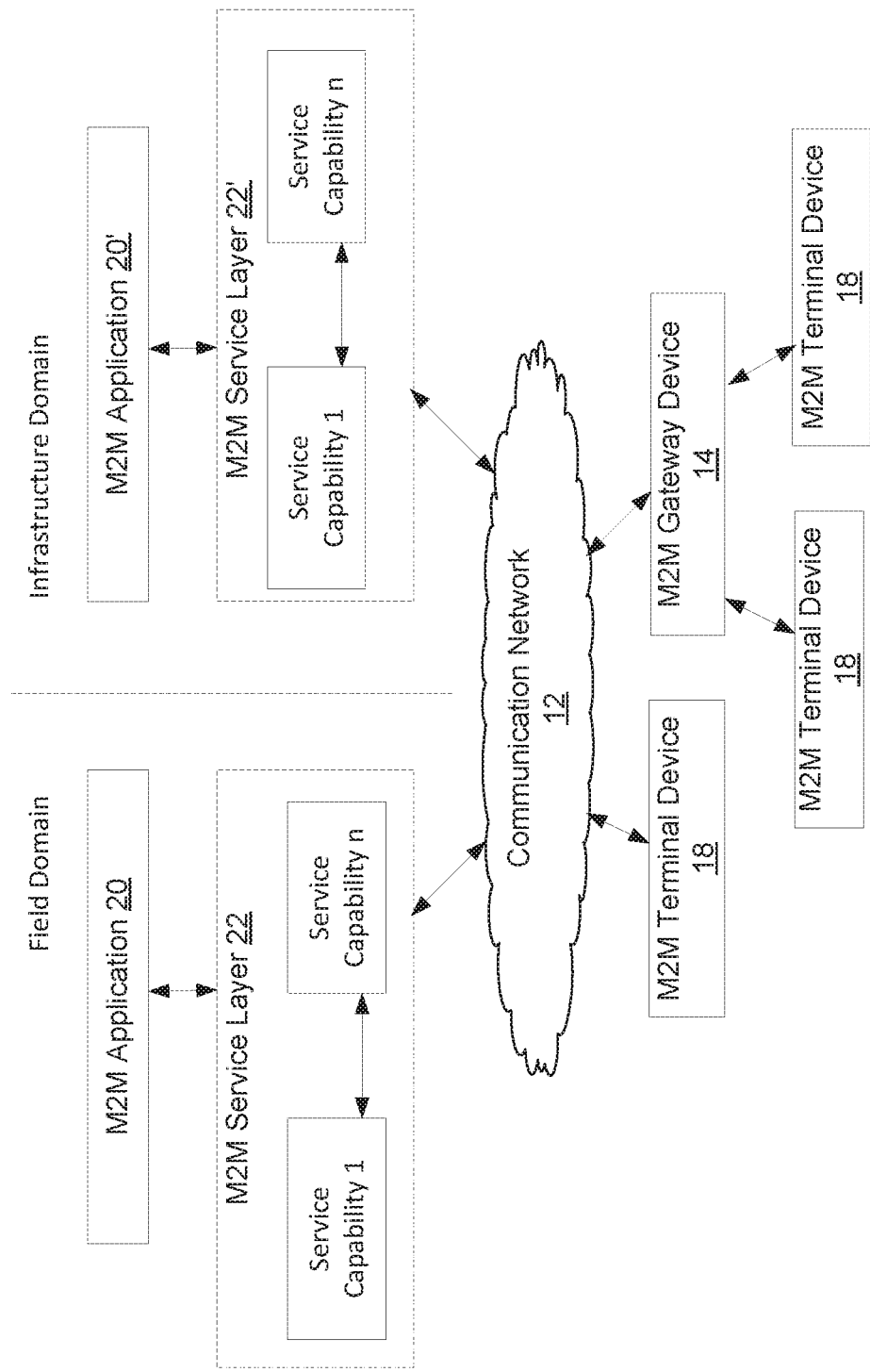
FIG. 33 is a system diagram of an example architecture that may be used within the M2M/IoT/WoT communications system illustrated in FIG. 32.

Referring to FIG. 33, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprise servers, computers, devices, virtual machines (e.g., cloud computing/storage farms, etc.) or the like.

Referring also to FIG. 33, the M2M service layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 32 and 33, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE) which may be hosted on different types of network nodes (e.g. infrastructure node, middle node, application-specific node). The Third Generation Partnership Project (3GPP) has also defined an architecture for machine-type communications (MTC). In that architecture, the service layer and the service capabilities it provides are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 34 or FIG. 35 described below.

For example, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Further, the methods and functionalities described herein may be implemented as part of an M2M network that uses a Service Oriented Architecture (SOA) and/or a Resource-Oriented Architecture (ROA) to access services.

Figure 34:
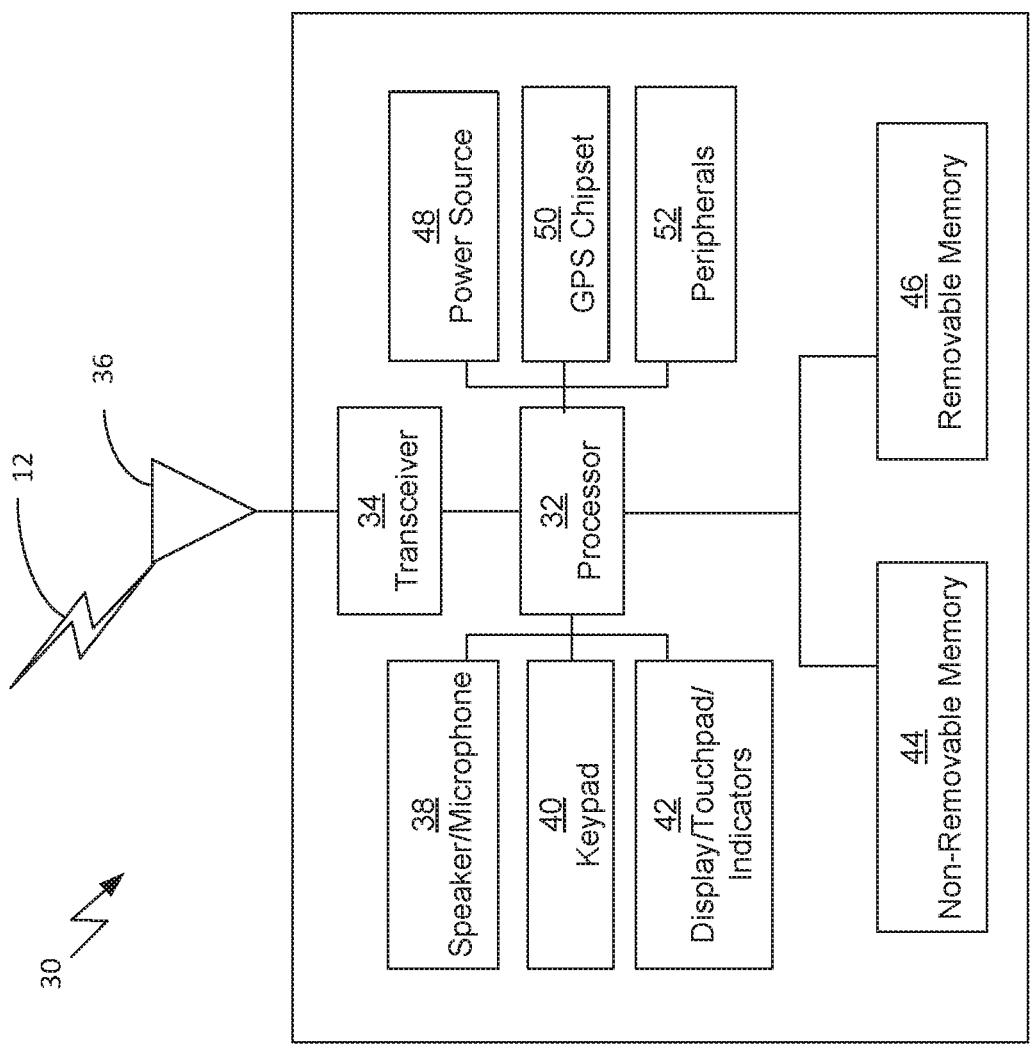
FIG. 34 is a system diagram of an example communication network node, such as an M2M/IoT/WoT device, gateway, or server that may be used within the communications system illustrated in FIGS. 32 and 33.

FIG. 34 is a block diagram of an example hardware/software architecture of a node of a network, such as one of the devices illustrated in FIG. 1-12 or 14-30, which may operate as an M2M server, gateway, device, or other node in an M2M network such as that illustrated in FIGS. 32 and 33. As shown in FIG. 34, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements aspects of the selective response to multicast requests functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 34, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein, e.g., as described in reference to FIGS. 1, 3-8, and 11-30, and in the claims. While FIG. 34 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 34 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 35:
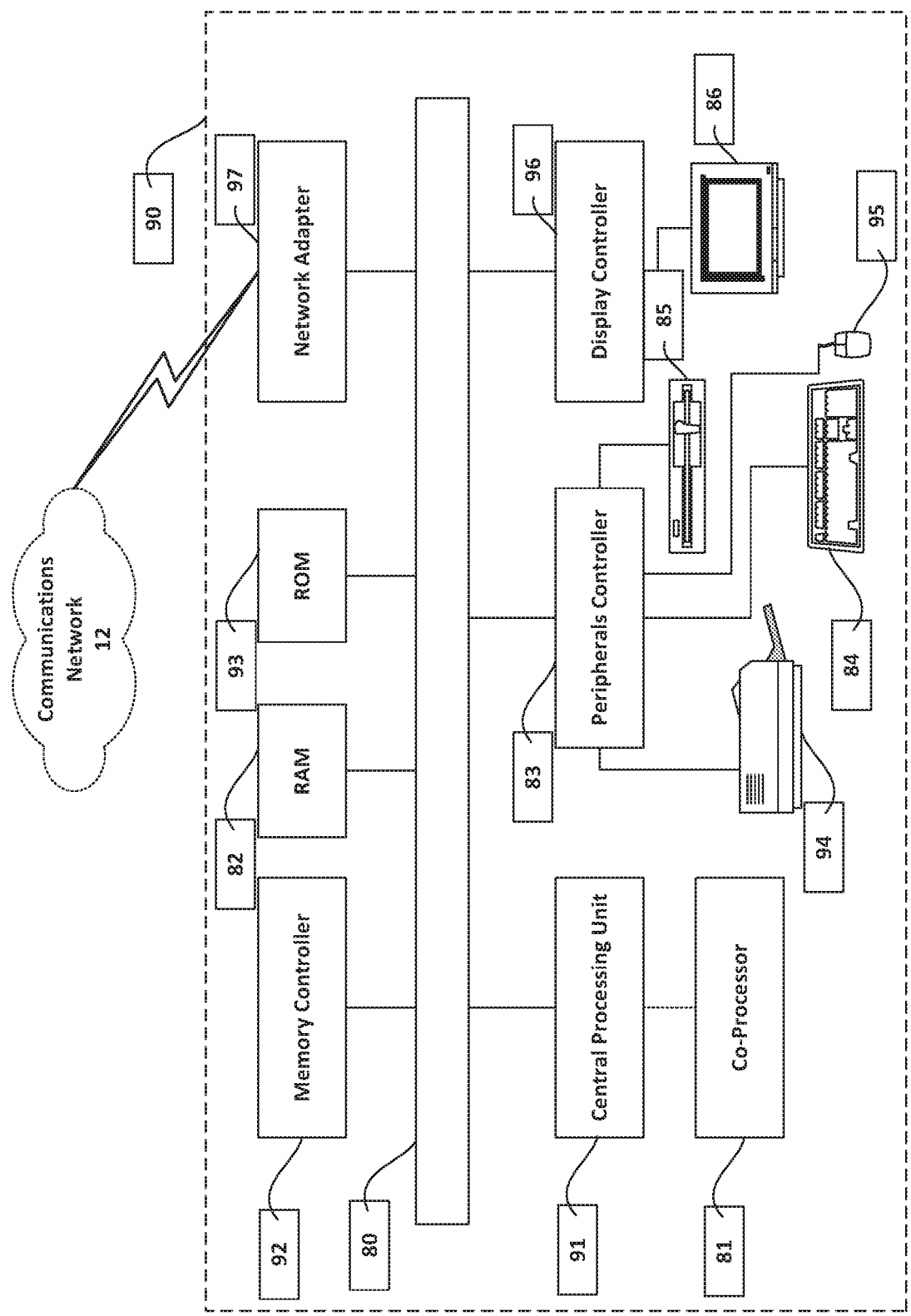
FIG. 35 is a block diagram of an example computing system in which a node of the communication system of FIGS. 32 and 33 may be embodied.

FIG. 35 is a block diagram of an exemplary computing system 90 which may also be used to implement one or more nodes of a network, such as the devices illustrated in FIG. 1-12, or 14-30, which may operate as an M2M server, gateway, device, or other node in an M2M network such as that illustrated in FIGS. 32 and 33. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as selective response to multicast requests.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 32 and FIG. 33, to enable the computing system 90 to communicate with other nodes of the network. The communication circuitry, alone or in combination with the CPU 91, may be used to perform the transmitting and receiving steps described herein, e.g., as described in reference to FIGS. 1, 3-8, and 11-30 and in the claims.

It is understood that any or all of the systems, methods, and processes described herein may be embodied in the form of computer executable instructions (e.g., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that may be used to store the desired information and that may be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A first apparatus comprising a processor, a memory, and communication circuitry, the first apparatus being connected to a communications network via its communication circuitry, the first apparatus further comprising computer-executable instructions stored in the memory of the first apparatus which, when executed by the processor of the first apparatus, cause the first apparatus to:
   implement a first resource directory;
   receive, from a second resource directory, the second resource directory residing on a second apparatus, a first request, the first request being a registration request comprising a resource directory identifier of the second resource directory and a resource directory identifier of a parent of the second resource directory;
   send, to the parent of the second resource directory, a second request, the second request being a request to validate the first request;
   receive, from the parent of the second resource directory, a response to the second request;
   determine to register the second resource directory based, at least in part, on the resource directory identifier of the second resource directory, a registration table, and the response to the second request or a lack of a response to the second request;
   register the second resource directory by adding a registration identifier of the second resource directory to the registration table; and
   send, to the second resource directory, a response to the registration request.

2. The first apparatus of claim 1, wherein the response to the registration request comprises a list of registered resource directories, or a list of available resources on one or more resource directories.

3. The first apparatus of claim 1, wherein the computer-executable instructions further cause the first apparatus to create the registration identifier of the second resource directory based, at least in part, on the resource directory identifier of the second resource directory.

4. A first apparatus comprising a processor, a memory, and communication circuitry, the first apparatus being connected to a communications network via its communication circuitry, the first apparatus further comprising computer-executable instructions stored in the memory of the first apparatus which, when executed by the processor of the first apparatus, cause the first apparatus to:
   implement a first resource directory;
   maintain a registration table comprising resource directory identifiers for multiple resource directories and data regarding resources available at the multiple resource directories;
   receive, from a client, the client residing on a second apparatus and being an endpoint or a second resource directory, a request for a resource;
   determine whether the resource is available at one of the multiple resource directories by examination of the registration table; and
   if the resource is not available within the first resource directory but is available at one of the multiple resource directories, send a response, to the client, providing a resource directory identifier for a resource directory having the resource.

5. The first apparatus of claim 4, wherein the request for the resource comprises a query attribute, and wherein the computer-executable instructions further cause the first apparatus to:
   maintain, within the registration table, data for the multiple resource directories pertinent to the query attribute;
   select a search set comprising a portion of the multiple resource directories based upon a match of the data to the query attribute;
   send, to the search set, a search query regarding the resource;
   receive, from a third resource directory, a first response to the search query;
   compose a response to the request for the resource based, at least in part, on the first response to the search query; and
   send, to the client, the response to the request for the resource.

6. The first apparatus of claim 5, wherein the query attribute is selected from the group consisting of a preferred resource directory identifier, a qualifier of resource directory identifiers, a limit on the number of resource directories queried, a type of resource sought, a type of endpoint served, a response time requirement, a geo-fence area, a set of GPS coordinates, a registration lifetime cutoff, an endpoint awake requirement, a loading capacity, a cache availability requirement, and a remaining lifetime requirement.

7. The first apparatus of claim 5, wherein the computer-executable instructions further cause the first apparatus to:
   receive, from a fourth resource directory, a second response to the search query; and
   include, in the response to the request for the resource based, information derived from the second response to the search query.

8. A first apparatus implementing a first resource directory, the first apparatus comprising a processor, a memory, and communication circuitry, the first apparatus being connected to a communications network via its communication circuitry, the first apparatus further comprising computer-executable instructions stored in the memory of the first apparatus which, when executed by the processor of the first apparatus, cause the first apparatus to:
   receive, from a second resource directory, the second resource directory residing on a second apparatus, a first request, the first request being a registration request comprising a resource directory identifier of the second resource directory and a resource directory identifier of a parent of the second resource directory;

send, to the parent of the second resource directory, a second request, the second request being a request to validate the first request;

receive, from the parent of the second resource directory, a response to the second request;

determine to register the second resource directory based, at least in part, on the resource directory identifier of the second resource directory, a registration table, and the response to the second request;

register the second resource directory by adding a registration identifier of the second resource directory to the registration table; and send, to the second resource directory, a response to the registration request.

9. The first apparatus of claim 8, wherein the response to the registration request comprises a list of registered resource directories, or a list of available resources on one or more resource directories.

10. The first apparatus of claim 8, wherein the computer-executable instructions further cause the first apparatus to create the registration identifier of the second resource directory based, at least in part, on the resource directory identifier of the second resource directory.

11. An apparatus implementing a first resource directory, the apparatus comprising a processor, a memory, and communication circuitry, the apparatus being connected to a communications network via its communication circuitry, the apparatus further comprising computer-executable instructions stored in the memory of the apparatus which, when executed by the processor of the apparatus, cause the apparatus to:

register with a first group of resource directories;

receive, from a client, a first query comprising an indication of a geo-fence area;

create, from the first group of resource directories, a second group of resource directories based at least in part on the geo-fence area;

send a second query to the resource directories in the second group of resource directories;

receive and aggregate results provided in response to the second query; and send the results to the client.

12. The first apparatus of claim 11, wherein the instructions further cause the apparatus to:

maintain a table of local resource directories; and prior to sending the second query, add the local resource directories to the second group of resource directories.

* * * * *